United States Patent
Hinderling et al.

(10) Patent No.: US 10,215,854 B2
(45) Date of Patent: Feb. 26, 2019

(54) DISTANCE MEASURING MODULE COMPRISING A VARIABLE OPTICAL ATTENUATION UNIT INCLUDING AN LC CELL

(71) Applicant: HEXAGON TECHNOLOGY CENTER GMBH, Heerbrugg (CH)

(72) Inventors: Jürg Hinderling, Marbach (CH); Paul Benz, Diepoldsau (CH); Josef Lais, Marbach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 608 days.

(21) Appl. No.: 14/694,885

(22) Filed: Apr. 23, 2015

(65) Prior Publication Data

US 2015/0309175 A1  Oct. 29, 2015

(30) Foreign Application Priority Data

Apr. 23, 2014 (EP) .................................. 14165580

(51) Int. Cl.
*G01C 3/08* (2006.01)
*G01S 17/08* (2006.01)
(Continued)

(52) U.S. Cl.
CPC ............ *G01S 17/08* (2013.01); *G01C 15/002* (2013.01); *G01S 7/4813* (2013.01); *G01S 7/4814* (2013.01);
(Continued)

(58) Field of Classification Search
CPC ...... G01S 17/08; G01S 7/4813; G01S 7/4814; G01S 7/4816; G01S 7/4868; G01S 7/499;
(Continued)

(56) References Cited

U.S. PATENT DOCUMENTS 5,329,118 A 7/1994 Riza
5,671,035 A 9/1997 Barnes
(Continued)

FOREIGN PATENT DOCUMENTS

CN 1463378 A 12/2003
CN 1756986 A 4/2006
(Continued)

OTHER PUBLICATIONS

European Search Report dated Feb. 6, 2015 as received in Application No. 14 16 5580.
(Continued)

*Primary Examiner* — Samantha K Abraham
(74) *Attorney, Agent, or Firm* — Maschoff Brennan

(57) ABSTRACT

The invention relates to a surveying apparatus, in particular tachymeter, laser scanner, profiler or laser tracker, comprising an electronic laser distance measuring module, which comprises an optical transmission channel and an optical reception channel for laser measurement radiation, wherein a variable optical attenuation unit for the laser measurement radiation is provided in the optical transmission channel and/or optical reception channel. According to the invention, light impinging on the attenuation unit is attenuated by means of liquid crystals. The attenuation unit comprises at least one polarizer, in particular comprising a polarization sheet, a liquid crystal shutter, in particular comprising nematic liquid crystals, having a variable transmission, a first analyzer, in particular comprising a polarization sheet.

12 Claims, 22 Drawing Sheets

(51) Int. Cl.
*G01C 15/00* (2006.01)
*G01S 7/481* (2006.01)
*G01S 7/486* (2006.01)
*G01S 7/499* (2006.01)
*G02F 1/1335* (2006.01)
*G02F 1/1343* (2006.01)
*G01S 17/42* (2006.01)
*G01S 17/66* (2006.01)
*G02F 1/133* (2006.01)

(52) U.S. Cl.
CPC .......... *G01S 7/4816* (2013.01); *G01S 7/4868* (2013.01); *G01S 7/499* (2013.01); *G02F 1/133528* (2013.01); *G02F 1/134309* (2013.01); *G01S 17/42* (2013.01); *G01S 17/66* (2013.01); *G02F 1/13306* (2013.01); *G02F 2001/13355* (2013.01); *G02F 2001/134372* (2013.01)

(58) Field of Classification Search
CPC ....... G01S 17/42; G01S 17/66; G01C 15/002; G02F 1/133528; G02F 1/134309; G02F 1/13306; G02F 2001/13355; G02F 2001/134372
See application file for complete search history.

(56) References Cited

U.S. PATENT DOCUMENTS

| | | | | |
|---|---|---|---|---|
| 5,877,831 | A | * | 3/1999 | Leenhouts ........ G02F 1/133753 349/110 |
| 6,377,327 | B1 | | 4/2002 | De Koning |
| 6,665,119 | B1 | * | 12/2003 | Kurtz ................... G02B 5/3058 353/20 |
| 6,959,124 | B2 | | 10/2005 | Boissier et al. |
| 7,170,568 | B2 | * | 1/2007 | Sekiguchi ................ B41J 2/465 349/143 |
| 2006/0007385 | A1 | | 1/2006 | Murata et al. |
| 2007/0002247 | A1 | * | 1/2007 | Lee ................... G02F 1/134363 349/141 |
| 2007/0202273 | A1 | | 8/2007 | Mariko et al. |
| 2009/0068380 | A1 | * | 3/2009 | Zheng ................. G02F 1/13363 428/1.3 |
| 2012/0140203 | A1 | | 6/2012 | Gusev |
| 2012/0147280 | A1 | * | 6/2012 | Osterman ............. G02B 27/26 349/9 |
| 2012/0224164 | A1 | | 9/2012 | Hayashi et al. |

FOREIGN PATENT DOCUMENTS

| | | | |
|---|---|---|---|
| CN | 101231343 A | 7/2008 | |
| CN | 101231387 A | 7/2008 | |
| CN | 102460209 A | 5/2012 | |
| DE | 200 22 604 U1 | 2/2002 | |
| DE | 20022604 U1 * | 2/2002 | ............ G01S 7/4811 |
| DE | 10215109 A1 | 10/2003 | |
| EP | 0 198 716 A2 | 10/1986 | |
| EP | 1 081 459 B1 | 6/2002 | |
| JP | S61-241723 A | 10/1986 | |
| WO | 2012/130302 A1 | 10/2012 | |

OTHER PUBLICATIONS

"Meadowlark Optics Catalog 2003", Internet Citation, XP002546744, Jan. 1, 2003, pp. 1-57.
J. L. De Bougrenet De La Tocnaye, "Engineering liquid crystals for optimal uses in optical communication systems", Liquid Crystals, vol. 31, Issue 2, 2004, pp. 241-269.
Riza, N. A., "High-optical-isolation low-loss moderate-switching-speed nematic liquid-crystal optical switch", Optics Letters, vol. 19, Issue 21, Nov. 1, 1994, pp. 1780-1782.
Wu et al., "Variable optical attenuator with a polymer-stabilized dual-frequency liquid crystal", Applied Optics, vol. 44, Issue 20, Jul. 10, 2005, pp. 4394-4397.
Ishii., Y., "The World of Liquid-Crystal Display TVs-Past, Present, and Future," Journal of Display Technology, vol. 3, Issue 4, pp. 351-360 (Dec. 2007).

* cited by examiner

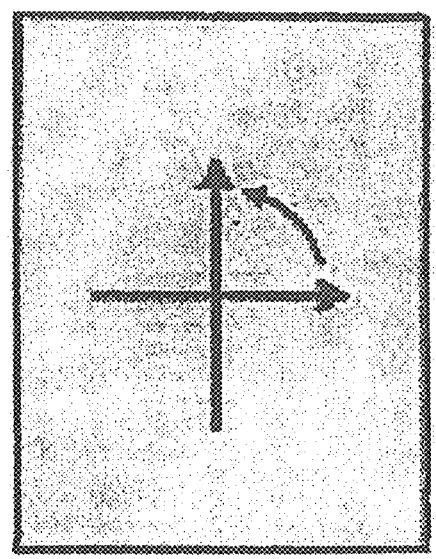
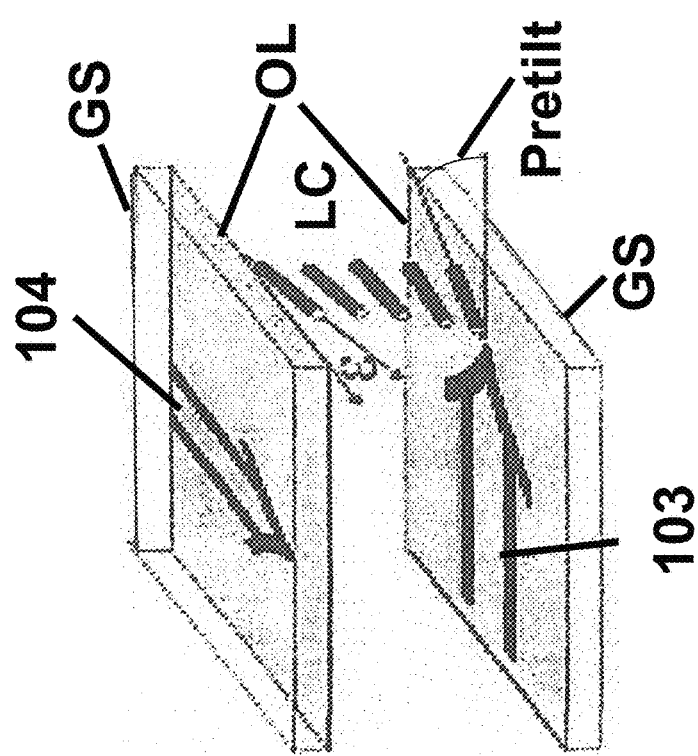
Fig. 11

| Schritte des Montageprozesses (für TN-LC-Zelle in „normally white" Anordnung) | Ausrichtung / Drehung | Anforderung / Toleranz / Kommentar |
|---|---|---|
| 1. LC-Zelle zwischen Positionen für Polarisator P und Analysator A1 (oder Glan-Thompson Prisma (GTP)) anordnen und mit 5 .. 20V (pp) / 0,2 .. 2kHz Rechteckspannung ansteuern | LCD≥5V | LC-Zelle wirkt ähnlich wie eine Glasplatte, die Doppelbrechung ist minimiert. |
| 2. LC-Zelle zwischen den beiden Polarisatoren P und A1 um die Laserstrahlachse drehen bis -> Minimum Lasersignal | LC-Zelle drehen um die Laserstrahlachse | ±1° .. ±2° |
| 3. Polarisator P auf LC-Zelle kleben | | |
| 4. Je nach Hilfsvorrichtung: Anstelle von Glan-Thompson Prisma (GTP) den Analysator A1 nach dem LC-Element platzieren | | |
| 5. Analysator A1 um die Laserstrahlachse drehen bis -> Minimum Lasersignal | Analysator A1 drehen um die Laserstrahlachse | ±0,1° oder genauer |
| 6. Analysator A1 auf LC-Zelle kleben | | |
| Für zweite Ausführungsform: zweiten Analysator A2 abringen | | |
| 7. Analysator A2 nach dem LC-Element platzieren | LCD=0V | |
| 8. Analysator A2 um die Laserstrahlachse drehen bis -> Maximum Lasersignal mit LC-Zelle ohne Spannung („normally white") | Analysator A2 drehen um die Laserstrahlachse | ±1° .. ±5° |
| LC-Abschwächer mit hoher Transmission und hohem einstellbarem Kontrast fertig | | |

Fig. 16

DISTANCE MEASURING MODULE COMPRISING A VARIABLE OPTICAL ATTENUATION UNIT INCLUDING AN LC CELL

FIELD OF THE INVENTION

The invention relates to a surveying apparatus, in particular tachymeter, laser scanner, profiler or laser tracker, comprising an electronic laser distance measuring module, which comprises an optical transmission channel and an optical reception channel for laser measurement radiation, wherein a variable optical attenuation unit for the laser measurement radiation is provided in the optical transmission channel and/or optical reception channel.

BACKGROUND

Generic optical attenuation units or attenuators are used in particular in electronic distance measuring modules (EDM). The distance measuring modules are assemblies for example of theodolites, of profilers or of laser scanners.

Known attenuators from the prior art substantially consist of a neutral filter wheel driven by motor. In general, ten to fifty attenuation stages are moved to discretely; the attenuation can typically also be set continuously, however.

In general, such an attenuator is situated in the optical transmission channel of an EDM, but can also be used in the reception channel of the EDM. One of the particular challenges for using an attenuator in an EDM is a very large setting range from very low to extremely high optical density of at least 5.0 ($=10^5$), typically associated with an exponential profile of the transmission between these two extreme states. The exponential profile means that in an angular increment the attenuation decreases or increases by a multiplicative rather than additive factor.

The high required signal dynamic range of an EDM is attributable firstly to the large distance range to be determined and covered of from less than 1 m to more than several kilometers, and secondly to the fact that the intention is to measure highly diffusely light-scattering target objects with markedly little backscattering and also prismatic target objects with retroreflection and extremely high optical quality, and correspondingly highly intensive reflection. In this case, the signal range extends over five orders of magnitude ($10^5$), thus forming the basis for the abovementioned requirements of the high variability of the transmission.

Attenuators in widespread use at the present time are often produced from a high density photographic black/white film. Both films comprising panchromatic emulsions and films comprising orthochromatic emulsions are suitable for this purpose. Such films have a polyester carrier, and so they are lightweight, of small dimensions, simple to produce and therefore cost-effective.

In conjunction with the rapid advance of digital photography, the traditional film business has largely been superseded in the meantime. The major manufacturers both of photographic emulsions and indeed also of the carrier materials that are of entirely satisfactory optical quality are gradually stopping production and sale of such films. In particular, the production of monochrome emulsions having high optical density is affected by this current development.

Although films of a high quality level are still currently available, they only have an average optical density of less than 3. The commercially available films that remain can no longer realize the required grayscale ranges that were achieved with ortho-films. The current color or b/w films only achieve values of up to approximately OD 2.5. Even with hard working developer solutions, full grayscale value reproduction, i.e. attenuation as great as required previously, is not achievable.

One possible form of realization for setting the signal range over five orders of magnitude ($10^5$) could be realized with a double pack of films having OD 2.5. However, this would have the disadvantage of increased scattered light, which should be prevented, as known. A further disadvantage would be the longer switching times owing to an increased moment of inertia.

Some variants of attenuation filters have a line- or grid-like grating structure, wherein a monotonic increase in the attenuation is achieved by an increasing density of the lines or by reduction of the size of the free openings of the grids. In addition, the attenuation is intensified by optical diffraction. A line or grating structure can additionally intensify the optical attenuation by diffraction, and attenuation ratios that are higher than the characteristic density curve of a film can be achieved.—Attenuators having a grating-like structure are not suitable, however, in a transmission channel having a light source, such as a laser, which emits diffraction-limited light, since the orders of diffraction produce discrete beam directions that disturb the sensor function of an EDM.

With regard to electro-optical attenuators or spatial modulators, a plurality of techniques have been tried out in the last twenty years or so. In addition to devices based on liquid crystals, for example, magneto-optical, semiconductor-based multi quantum well arrangements or deformable mirrors have been proposed for use as attenuators. Hitherto, only arrangements based on liquid crystal technology (manufacturer: Boulder Nonlinear Systems) and MEMS-based micromirror technology (manufacturer: Texas Instruments) have found a use in commercial products; such an arrangement for an attenuator is also disclosed in US 2012/0224164 A1.

Non-optical signal attenuations are also conceivable, for example signal attenuation in the electrical part of the signal path. In this case, the driving of the light emitting laser diode, for the variation of the generated output light intensity, control of the APD gain of the receiving diode and also the driving of the electrical amplifier stages as far as the analog-to-digital converter and also electro-optical fiber attenuators come into consideration.

These attenuation possibilities have actually always been used, although generally only in a supplementary rather than sole function for signal attenuation; this is because the signal dynamic range that is to be covered with a distance measuring module exceeds the possibilities of these electrical attenuation methods, even if the latter are combined. By way of example, the signal from reflective articles is at least millions of times stronger than that from a dark diffuse object surface. Electrical receiving circuits of the abovementioned type achieve dynamic ranges in the range of approximately three orders of magnitude.

Optical attenuators are linear with regard to technical signal transmission behavior, that is to say that they are linear both in terms of phase (propagation time) and in terms of amplitude, and the transmitted signals are undistorted, which is advantageous for a high measurement accuracy of an EDM module.

Fiber-optic attenuation devices are also known. Although they operate rapidly and can set a desired signal strength even with a switching time of a few nanoseconds, they are inexpediently large in terms of the mechanical dimensions and relatively expensive.

However, none of the previous products based on the alternative solutions proposed to date satisfies the requirements of the high dynamic range of OD0 to OD5 or even OD6.

SUMMARY

Some embodiments of the present invention provide an attenuator which, with a dynamic setting range of the optical density over five orders of magnitude, can achieve an optical density of at least OD5. Some embodiments enable the signal of an EDM to be set as far as possible by means of a single attenuation unit, as a result of which structural volume and costs can be reduced.

For what has now already been some considerable time, liquid crystal displays or liquid crystal screens (LCDs) have been employed for example in metrology or consumer electronics. Their function is based on the fact that liquid crystals influence the polarization of light if a specific amount of electrical voltage is applied to them.

LCDs consist of segments that can change their transparency independently of one another. For this purpose, the alignment of the liquid crystals is controlled individually by electrical voltage in each segment. The transmissivity to polarized light generated by a backlighting system and polarization filters thus changes.

In order to be suitable for a liquid crystal shutter according to the invention, LCD LC glass cells must have homogeneous optical properties over the entire free opening. They must permanently have a high leakproofness and be resistant to ageing phenomena. Likewise, the contacts of electrodes to be connected to the LCD should not exhibit any restrictions of functionality as a result of ageing or corrosion. The contacts are advantageously equipped with a flexible printed circuit board.

The liquid crystals used most often in the field of display and image technology are nematic crystals. A component that exhibits a liquid-crystalline phase is called a mesogen. The nematic phase of achiral mesogens is the simplest type of liquid-crystalline phases. In said phase the molecules have an orientational order relative to a so-called "director", the unit vector of the direction. The resulting preferred orientation is generally constant only for small volumes. The centers of mass of the molecules are distributed statistically, analogously to liquids: no long-range positional order whatsoever occurs.

Various structures, so-called liquid crystal cells, act as polarization rotators. The best known are twisted nematic LCD (TN); these cells have a particularly simple construction and rotate the polarization by only 90°.

Liquid crystals used in liquid crystal displays are organic compounds that have properties both of liquids and of solids. On the one hand, they are more or less fluid than a liquid; on the other hand, they exhibit properties, such as birefringence, that are predominantly known from solids. A simple liquid crystal display element can be realized with the Schadt-Helfrich cell, also referred to as twisted nematic cell.

Optical attenuation factors relative to the state with maximum transmission of more than $10^5$ can be achieved by means of a very particular LC structure.

In the case of TN-LCD, incident light is linearly polarized before entering the element. The twist of the molecules in the TN-LCD results in a rotation of the light polarization direction, as a result of which the light can pass through the second polarizer, rotated by 90°, and the cell is transparent.

When an electrical voltage is present at the electrodes, the liquid crystal molecules align predominantly parallel (in the axial direction) to the electric field and the twist is increasingly cancelled as a result. The light polarization direction is no longer rotated and therefore the light can no longer pass through the second polarization filter.

TN-LC cells are distinguished by their very high transmission in the open state, which to date has not been achievable or has hardly been achievable with other LCD technologies.—The TN cell is therefore a voltage-controlled light valve. A screen can consist of an arbitrary number of such cells (pixels).

Further developments of TN cells are STN cells ("Super-Twisted Nematic"), DSTN cells ("Double Super-Twisted Nematic") and TSTN cells ("Triple Super-Twisted Nematic").

In the case of STN-LCD, the twist angle of the molecules is increased to 180° to 270°. As a result, the electro-optical characteristic curve (attenuation relative to control voltage) changes; it becomes considerably steeper. With regard to the construction of a grayscale attenuator, however, the gray levels should be settable in a finely resolved manner with high precision. In the case of STN crystals with higher twist (180° . . . 360°), however, the molecular alignment reacts to the electrical voltage more steeply to abruptly; as a result, black-and-white states but no gray levels are settable. Owing to this lack of a possibility of fine regulation of the transmission, STN cells are less well suited to an attenuation unit according to the invention.

By contrast, grayscale values with high resolution can be set with a TN cell, however.

The complex construction of a DSTN liquid crystal cell causes a relatively high outlay during the production thereof. A new method resulting in flatter displays of lower weight was therefore developed. This new solution bears the name "Triple Super-Twisted Nematic" LCD (TSTN). The color disturbances of normal STN technology are compensated for by two special films fitted in front of and behind the cell—between polarizer and glass. These films are responsible for a further name of this technology: FST, which means "Film-Super-Twisted" (occasionally, displays in which only one compensation film is used are referred to as FST-LCD, and those having two or more films as TST-LCD; the designation FSTN is likewise customary for film-STN). The improved contrast (up to 18:1), the lower weight and the flatter and less complex design have helped TSTN-LC displays to gain acceptance. In notebook computers, such displays were realized for the first time as a "VGA screen".

With the commercialization of flat screen TV sets, a new impetus has been given to LCD development in the last ten years.

Various types of LC cells have been developed for display products, namely twisted nematic (TN), vertical alignment (VA), in-plane switching (IPS) and fringe field switching (FFS). The designation refers to the arrangement of the molecules of the liquid crystal and/or of their movement upon electrical driving.

With regard to the subject of LCD TVs, two main types thereof are currently prominent: vertical alignment (VA) screens and in-plane switching (IPS) screens. The main difference consists in how the liquid crystals are arranged with respect to the substrate plates.

In the case of the VA cell, the elongate molecules are perpendicular to the two glass carrier plates, whereas the molecules lie in the plane of the screen in the case of the IPS or FFS cell.

VA screens have a construction comparable to the TN cell. The two electrodes are each arranged opposite the liquid gap. The advantages of VA screens reside in a higher contrast (>>1000:1 is customary) than in the case of a TN screen (<1000:1); however the maximum transmission of VA cells is generally lower than that of TN cells.

In the case of in-plane switching (IPS) technology, the electrodes are situated alongside one another in a plane parallel to the display surface. When voltage is applied, the molecules rotate in the plane of the screen; the helical shape typical of TN displays is omitted. IPS reduces the dependence of contrast on the viewing angle (said dependence is actually referred to as dependence on the direction of view or viewing direction).

A cell consisting of a single, but very large, pixel is required for the attenuator sought. This pixel is not easy to realize with the IPS cell, in which the electrodes are fitted on one side of the substrate. However, if the cell is designed as a reflection element, then a matrix-like electrode arrangement known from display technology can be entirely expedient.

FFS cells have been developed for displays of mobile, handheld devices such as cell phones or tablet PCs.

FFS technology is comparable to that of IPS. The arrangement of the electrodes is likewise on one side on a substrate in order to generate a so-called in-plane field. In the case of IPS technology, however, the positive and negative electrodes that establish a matrix alternate with one another, whereas in the case of FFS technology the strip electrodes all have the same potential and are arranged in front of a common large-area counterelectrode. This increases the optical efficiency of the cell; by way of example, the maximum transmission is almost as high (95%) as in the case of a TN cell (reference value 100%). The other two technologies have a transmission of 80% in the case of IPS and 80% in the case of VA.

A particular advantage of the FFS cell is the large angle of incidence that can be used, and the broad achromatism as a result of autocompensation of polarized light. The effects associated with dielectric anisotropy (i.e. the dielectric constant is dependent on the angle of incidence) are attenuated in the case of the FFS cell. This is related to the opposite behavior of a positive crystal liquid, which differs from the others; by way of example, VA acquires a negative dielectric anisotropy $\Delta\varepsilon < 0$.

Liquid crystals optimized for FFS cells and having wide temperature ranges of −30° C. to +80° C. are also available.

The attenuation and hence the contrast changes with the angle of incidence or viewing angle with respect to the LC cell. For the attenuator sought, however, the cell is intended to provide a sufficiently large range for angles of incidence with high contrast.

This angle dependence is defined both by the type of LC cell and by the arrangement of the polarizers. With regard to the applied electric field, the LC cells can be subdivided into two types, namely cells having a longitudinal and a transverse (fringing) field. In the state with a voltage U>0 V the cigar-shaped molecules rotate by 90° along the axial electric field in the case of the TN cell, and likewise by 90° perpendicular to the axial electric field in the case of the VA cell; in this case, the viewing angle is small and asymmetrical because the polarization influence of the LC film as a result of the 90° tilt angle changes at different oblique viewing angles (field of view, FOV).

In particular, black changes to gray.

In the case of LCs for screens, this disturbing effect is partly omitted, to be precise by means of uniaxial or biaxial phase retardation films. As a result, the polarization state emerging from the LC layer becomes less dependent on the viewing angle and the attenuation remains high ("reduced light leakage").

If, as a result of an external transverse electrical voltage, the molecular alignment remains restricted to a fixed plane, the molecules move and realign in one plane, then the intrinsic viewing angle is greater than in the case of the longitudinally driven LC cells. However, the limited degree of blocking (light leakage) of crossed polarizers in the case of oblique beam paths or viewing angles is still present, which in turn demands additional compensation films. Phase compensation films known for display technology are the A-films, where the optical axis lies in the film plane, and the C-films, in which the optical axis is oriented perpendicular to the film plane. The construction of an optical configuration having an improved field of view consisting of polarizers, various phase compensation films and a liquid crystal layer as a specific phase retarder is preferably designed with the aid of the Poincaré sphere representation. The polarization state for different angles of incidence can be tracked from film to film by means of the Poincaré sphere, and the polarization state of the optical beam that is generated by the entire LC cell can be checked for optimum extinction.

For the inventive LC cell, a highest possible transmission is required at all events in the open state. Additional films such as the A-films or C-films having intrinsic residual absorption are therefore not a good solution.

The LC cell sought is therefore intended to manage without compensation films. IPS-LC cells are advantageous in this regard since they already cover a relatively large angular range without phase compensation films.

However, IPS technology is unsuitable for one-pixel structures having a large beam diameter; the homogeneity of the electrical field over the beam cross section is insufficient.

All these nematic LCDs require polarizers on both sides in transmission. In this case, polymer polarization films with an adhesive layer on one side can be applied directly to the glass plates of the nematic LCD cell. By applying a voltage to the cell, it is possible to control the rotation angle of the light polarization or the phase retardation between two orthogonal polarization states; the attenuation can thereby be set. Optical densities of OD5 or higher can be achieved by means of a very particular construction of the LC attenuator.

An aim of the present invention as already mentioned is to provide an attenuator which as sole attenuator unit can vary the sensor signal over a dynamic range of $10^5$.

Since even an attenuation factor of $10^4$ is difficult to achieve, an arrangement consisting of two LCD attenuator units is accepted as an alternative embodiment. As transmitter-side attenuator unit of an electronic distance measuring module, by way of example, a polarizing LC cell having a relatively high contrast coupled with an OD of $10^4$ would be acceptable if an LC cell without polarization influence with a low contrast of $10^2$ were arranged in the reception channel. As LC cells without polarization influence, consideration would be given to "liquid crystal smart glasses", "suspended particle cells" or other light scattering or absorbing cells such as, for example, a polymer dispersed liquid crystal as attenuator.

Some embodiments of the invention, therefore, provide a variable optical attenuation unit, in particular for an electronic distance measuring module.

In particular, an attenuation generated is intended to be finely adjustable over a dynamic range of at least five orders of magnitude, from almost complete transparency to an attenuation of $10^5$.

Some embodiments in addition fulfill this required function with as far as possible only a single optical unit.

The invention provides a variable optical attenuation unit, in particular for an electronic distance measuring module, for use in a geodetic measuring apparatus, in particular a theodolite. According to the invention, light impinging on the attenuation unit is attenuated by means of liquid crystals. The attenuation unit comprises at least one polarizer, in particular designed as a polarization sheet, a liquid crystal shutter, in particular comprising nematic liquid crystals, having a variable transmission, a first analyzer, in particular designed as a polarization sheet.

The attenuation unit according to the invention thus has a very simple construction.

Advantageously, the polarization sheet of the polarizer and/or the polarization sheet of the analyzer are/is designed with a single-sided self-adhesive film and adhesively bonded onto a transparent carrier, for example a glass substrate or a glass substrate plate, and/or provided on one side with an antireflection layer, in particular optimized for the spectral range of 660 nm to 1550 nm.

A very compact construction and a simple production of the attenuation unit according to the invention are made possible by the self-adhesive films.

In order to enable high contrast, an attenuation unit according to the invention is optimized with regard to the following aspects:

Use of high-contrast polarizers having high transmission for one polarization state and low transmission for the other polarization state;

Optimization for the respective wavelength of use;

Homogeneity over the free opening of polarizer and analyzers;

Homogeneity over the free opening of the liquid crystal cell (which in particular also concerns possible tilting and phase changes in the course of the light passage);

Adequate sensitivity and/or resolution in order to make the desired attenuation finely settable between the states of maximum and minimum transmission;

Solving potential problems as a result of temperature drifts (for example the drift of "rel. retardance=0.4%/K" (birefringence) has to be compensated for in terms of software);

Taking account of isocontrast curves of the liquid crystal shutter, for example in the case of orientation with respect to the laser beam with identical azimuthal orientation.

Simple and cost-effective polarizers having both high transmission for one oscillation direction and the lowest possible transmission for the other, orthogonal oscillation direction are plastic films comprising aligned absorbent molecules or transversely arranged, metallic nanostructures. Contrast values of up to 500,000 at 650 nm, 800 nm or 1550 nm are achievable with such films.

In accordance with one advantageous embodiment, the liquid crystal shutter comprises a "twisted nematic" liquid crystal cell TN-LCD. In particular, the polarizer and the analyzer A1 have a mutually crossed polarization direction, i.e. polarization direction rotated by 90° with respect to one another. In this case, especially the liquid crystal cell TN-LCD is operable in the "normally white mode".

Twisted nematic liquid crystal cells are distinguished by a comparatively particularly simple construction. Operating a TN-LC cell in the normally white mode has a positive effect with regard to a reduced energy consumption.

In accordance with a different embodiment, the liquid crystal shutter L comprises an "FFS" liquid crystal cell FFS-LCD. FFS stands for "fringe field switching". FFS technology is based on a transverse electric field aligned parallel to the substrate or glass surfaces of the liquid crystal shutter, wherein an electrode E+ and the counterelectrode E− are situated on the same side of the cell and are separated from one another by an insulation layer. Very strong field amplitudes at the electrode edges enable effective and fast switching. The electrode configuration generates a higher transmission in the open state in comparison with IPS technology. However, the size of the cell structure is limited; in the case of cells having only a single pixel, as desired for the present invention, the distance between the electrodes becomes large, which results in high required drive voltages U and causes the field strength E at the edge (range) of the strip or hollow electrode to rise to very large values, which drops toward the center of the pixel. In the case of large pixel dimensions in comparison with the liquid thickness, the field in the cell center is practically zero and the switching or attenuation function is no longer provided there as a result. Typically, this liquid crystal shutter is operated in the normally black mode, i.e. the passage of light is blocked in the voltage-free state; the cell becomes transparent with applied voltage.

In accordance with a further embodiment, the liquid crystal shutter comprises a "vertically aligned nematic" liquid crystal cell VAN-LCD. In the case of VA technology, the liquid crystal molecules in the natural arrangement, i.e. in the rest state or without any applied voltage, are vertically aligned with respect to the two glass substrates or glass carriers. In the state without a drive voltage, the molecular axes remain in a perpendicular position relative to the glass plate plane, and in combination with crossed polarizers the transmission is minimal ("black" or "normally black"). As an applied electrical voltage U is increased, the molecules rotate out of this vertical position. The greater the tilt angle of the LC molecules, the greater the transmission becomes. Grayscale values and thus the desired optical densities can be set as a result. In order that the liquid crystal molecules rotate out of the electric field lines under the action of an electric field E, liquid crystal mixtures having negative dielectric anisotropy are required for VA cells.

Without an electrical voltage present, the molecules are aligned almost ideally along the optical beam axis. The light polarization is not altered in this case, which leads to a high contrast in combination with crossed polarizers, and light entering the cell cannot pass through the cell. With increasing electrical voltage, the molecules rotate out of the beam axis, and thus so does the refractive index ellipsoid anchored with the molecular structure. Birefringence starts to take effect, and the laser beam traversing the liquid experiences a change in polarization, as a result of which the transmission increases upon passing through the first analyzer. VA screens are normally operated in the "normally black" arrangement owing to the high contrast, which means that the LC element is nontransparent in the absence of an applied electrical voltage. In order that the liquid crystal molecules LC align perpendicularly to the two substrate glasses GS in the state without an electrical voltage, said substrate glasses are provided with electrically polar stabilizing polymers SP.

Advantageously and in a manner combinable with any of the abovementioned embodiments, a second analyzer is provided, which is likewise designed in particular as a polarization sheet. In particular, the polarization sheet of this analyzer is likewise designed with a single-sided self-adhesive film and adhesively bonded onto a transparent carrier and/or provided with an antireflection layer on one side.

In accordance with one embodiment, the polarizers and/or analyzers are designed as linear polarizers.

In accordance with a different embodiment, they are designed as circular polarizers. In this case, the circular polarizers are designed in particular as a combination of a linear polarizer with a λ/4 phase plate.

In accordance with a further embodiment, the polarizers and/or analyzers are designed as wide-angle polarizers, in particular comprising a sandwich structure or combination structure composed of a polarizer and a phase plate. Advantageously, it is thereby possible to reduce the so-called "light leakage" effect of crossed polarizers with an oblique laser beam, which is essential for a high optical density.

The liquid crystals typically have a chromatism optimized to a light wavelength of 650 nm or 1550 nm.

In accordance with one embodiment, the liquid crystals are mixed with spacer elements. Advantageously, said spacer elements have a diameter of 3 μm to 10 μm, in particular of 3 μm to 7 μm. In particular, the spacer elements are designed as fibers or as glass beads.

As a result of the small dimensions of the spacer elements, disturbing scattered light effects potentially caused by said spacer elements are minimized.

The liquid crystals of an attenuation unit according to the invention typically have a switching time of shorter than ten milliseconds (for temperatures below 0° C.), in particular of less than one millisecond (for temperatures above 0° C.), over a temperature range of at least −20° C. to +60° C.

A further subject matter of the invention is an electronic distance measuring module (EDM) having an optical transmission channel and an optical reception channel. According to the invention, in this case an attenuation unit according to the invention according to one of the abovementioned embodiments is arranged in the optical transmission channel or in the optical reception channel, or in both channels.

In accordance with one embodiment, the electronic distance measuring module comprises an attenuation unit according to the invention in the optical transmission channel and only a polarization-independent liquid crystal shutter having a variable transmission, but without an assigned polarizer and/or analyzer, in the optical reception channel. By way of example, LC cells which function on the principle of the dynamic scattering mode (DSM) are polarization-free, wherein their settable attenuation range is typically less than 500.

In accordance with a different embodiment, the electronic distance measuring module likewise comprises an attenuation unit according to the invention in the optical transmission channel, while a polarization-selective beam splitter for the polarization-selective splitting of the reception light into two partial beams having different polarizations downstream of the polarization-selective beam splitter in the optical path is arranged in the optical reception channel, an attenuation unit according to the invention being arranged in the optical paths of said partial beams. In this case, it is desirable for the partial beams to be set to identical optical path lengths and identical light propagation times.

In accordance with a further embodiment, similar to the abovementioned embodiment, the electronic distance measuring module likewise comprises an attenuation unit according to the invention in the optical transmission channel and comprises in the optical reception channel a polarization-selective beam splitter for the polarization-selective splitting of the reception light into two partial beams having different polarizations downstream of the polarization-selective beam splitter in the optical path. In accordance with this embodiment, however, in one of the two partial beams a λ/2 plate is arranged downstream of the polarization-selective beam splitter in the optical path. Both partial beams are then fed to a common attenuation unit according to the invention. In particular, in accordance with this exemplary embodiment, too, the partial beams are set to identical optical path lengths and identical light propagation times.

A further subject matter of the invention is a method for producing an attenuation unit according to the invention. This method comprises the following steps:

arranging the liquid crystal shutter between positions provided for the polarizer and the first analyzer, and applying a voltage, in particular a rectangular voltage of between 5 V and 20 V pp and 0.2 kHz to 2 kHz, to the liquid crystal shutter;

rotating the liquid crystal shutter about the optical axis of an incident laser beam until an observed laser signal attains a minimum, in particular with an angular tolerance of ±1° to ±2°;

connecting the polarizer to the liquid crystal shutter, in particular in the case of a polarizer designed as a polarization sheet by adhesively bonding the polarization sheet onto a glass substrate plate of the liquid crystal shutter;

positioning the first analyzer downstream of the liquid crystal shutter, in particular replacing a Glan-Thompson prism positioned upstream, if appropriate;

rotating the first analyzer about the optical axis of the incident laser beam until an observed laser signal attains a minimum, in particular with an angular tolerance of ±0.1° or more accurate;

if appropriate—in the case of a first analyzer designed as a polarization sheet—adhesively bonding the polarization sheet onto a glass substrate plate of the liquid crystal shutter.

This first embodiment of the production method according to the invention is thus concluded.

In accordance with one development, for the purpose of equipping the attenuation unit with a second analyzer, after the steps above, the following further method steps are carried out:

arranging a second analyzer (A2) behind the liquid crystal shutter, said arranging being carried out with voltage switched off at the liquid crystal shutter; and rotating the second analyzer about the axis of an incident laser beam until an observed laser signal attains a maximum, in particular with an angular tolerance of ±1° to ±5°, said rotating being carried out with voltage switched off at the liquid crystal shutter.

This modified embodiment of the production method according to the invention is thus also concluded as well.

In order that an attenuation unit according to the invention can achieve the required specifications, for the production method according to the invention it is necessary that the optical axes of polarizer, analyzers and liquid crystal shutter are mutually aligned to an accuracy of at least 1°, and that in particular the optical axes of polarizer and analyzers are aligned to a mutual accuracy of 0.1° or more accurately. In this case, the alignment is advantageously measured and monitored with the use of an auxiliary laser source.

When a liquid crystal shutter is mounted and aligned with respect to the laser beam in an EDM module, consideration should be given to the following:

The optimum alignment angle is determined by the iso-contrast curve diagram. (This term will be explained in greater detail in the description part of this application.)

The optimum alignment angle influences the attenuation curve of the element.

A disturbing influence resulting from back-reflections from the optical surfaces of the liquid crystal cell should be prevented.

When the method is performed correctly, a variable setting range of the contrast of 1 to $10^5$ is achieved, whereby the required specifications are fulfilled. In this case, contrast is understood to mean the ratio between maximum and minimum transmission that can be set. If the maximum transmission is less than 1, an optical density of more than $10^5$ is needed in order that a contrast of $10^5$ can be achieved.

A series of tests on TN liquid crystal shutters which were produced according to the method described have shown that contrast values of up to 1:250,000 are achievable. TN liquid crystal shutters, in particular, therefore appear to be particularly well suited to an attenuation unit according to the invention.

Moreover, with the TN cells—alongside the FFS Structures—in the light-transmissive state of the liquid crystal shutter the highest transmission values were achieved, which is advantageous for enabling a restricted optical power of the light sources, and reduces the energy consumption particularly in the case of battery-operated instruments.

BRIEF DESCRIPTION OF THE DRAWINGS

The invention is described in greater detail purely by way of example below on the basis of concrete exemplary embodiments illustrated schematically in the drawings, further advantages of the invention also being discussed. In the figures in specific detail:

FIG. 11 shows an illustration of the mode of action of a polymer layer applied on the glass substrates of the TN cell of a liquid crystal shutter according to the invention as an orientation layer for the liquid crystal molecules;

FIG. 16 shows in tabular form a summary of a method according to the invention for producing a liquid crystal shutter according to the invention;

DETAILED DESCRIPTION

Figure 1A:
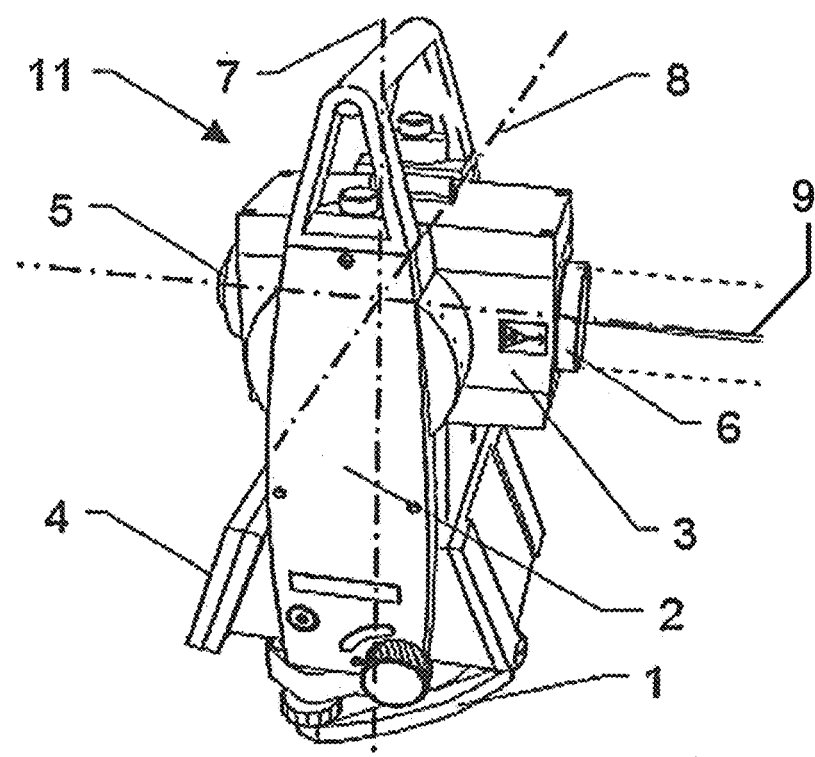
FIG. 1a shows a theodolite as a first example of a geodetic measuring apparatus in which an electronic distance measuring module is used.

FIG. 1a shows a theodolite as a first example of a geodetic measuring apparatus in which an electronic distance measuring module is used. The theodolite 11 comprises a base 1 with an upper part 2 mounted rotatably thereon. A targeting unit 3 mounted pivotably on the upper part 2 and having an objective lens 6 having an optical axis 5 (targeting axis) is typically equipped with a laser source designed for emitting a laser beam 9 and with a laser light detector and thus provides a distance measuring functionality for determining the position of a target object. Furthermore, the theodolite 11 is equipped with an output unit 4, in particular with a display. Moreover, the apparatus has two mutually perpendicular axes 7, 8 (vertical axis 7 and tilt axis 8) for alignment with an object.

Figure 1B:
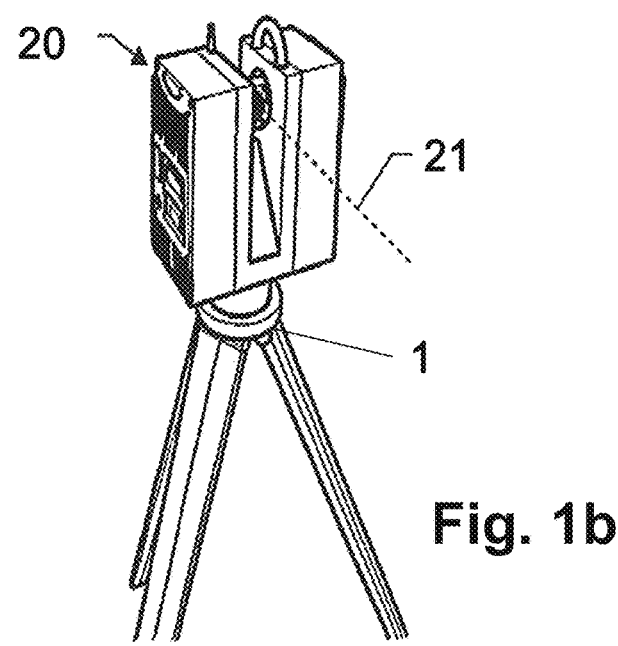
FIG. 1b shows a terrestrial scanner as a second example of a geodetic measuring apparatus in which an electronic distance measuring module is used.

FIG. 1b shows a terrestrial scanner 20 for contactlessly scanning a remote object in three or two dimensions as a second example of a geodetic measuring apparatus in which an electronic distance measuring module is used. The laser scanner 20 may be suitable for specific monitoring, capture, digitalization, etc. of static or dynamic objects. The laser scanner 20 is mounted rotatably on a base 1 and can scan a full panorama with a field of view of 360°×360° by means of 360° pivots about two pivoting axes and can thus scan scenery with a plurality of objects by means of measurement light beams 21 emitted by means of a mirror (not illustrated) in the direction of the object.

Figure 2:
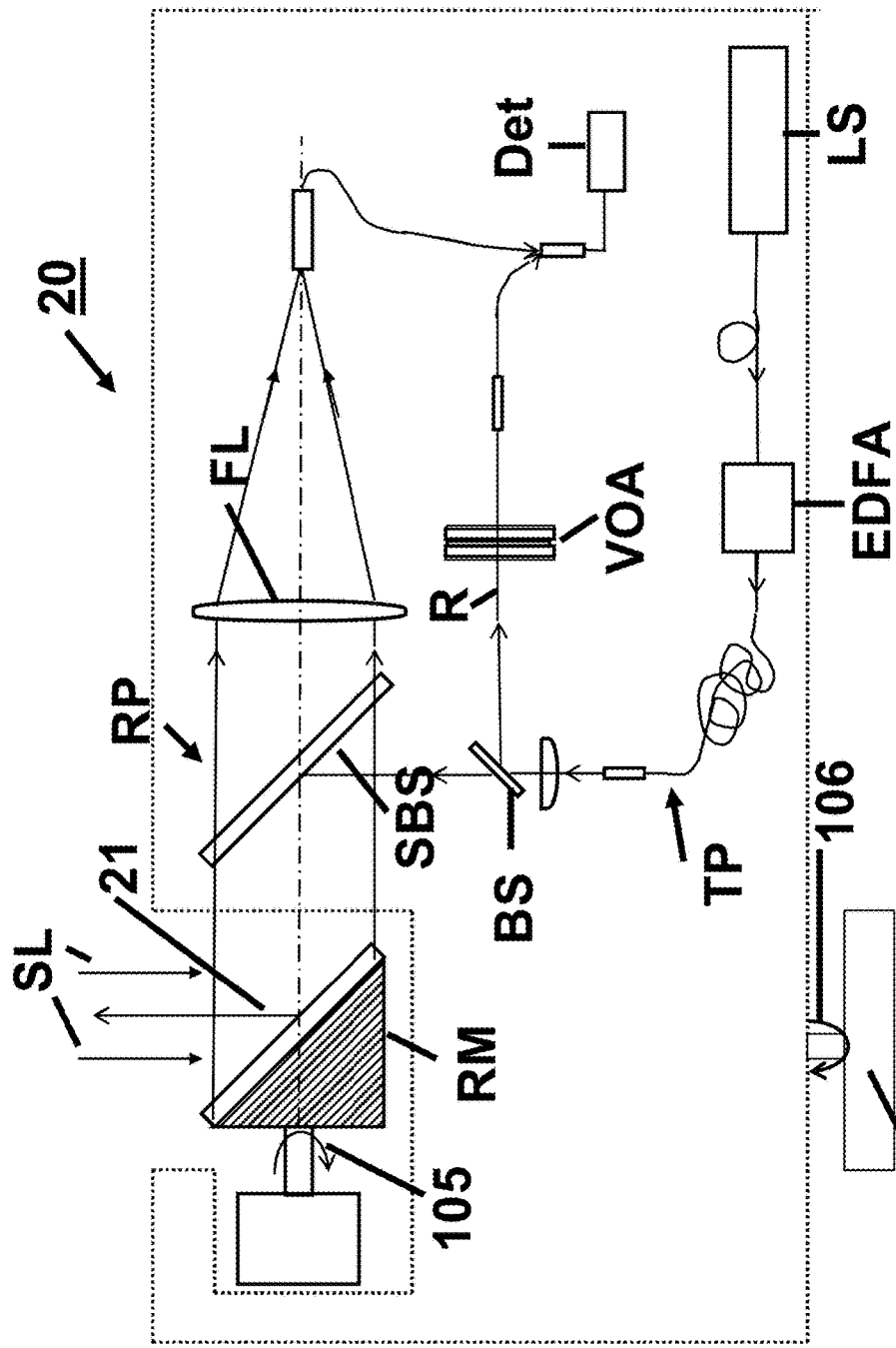
FIG. 2 shows a schematic diagram of one possible fundamental optical construction of the scanner from FIG. 1b.

FIG. 2 shows a schematic diagram of one possible fundamental optical construction of the scanner 20 from FIG. 1b in which an electronic or optoelectronic attenuation unit according to the prior art is used. The emission light from a light source LS, typically a laser, is directed on the transmission light path TP (transmission channel) firstly to an optical amplifier EDFA ("erbium-doped fiber amplifier"), which optically amplifies the input light, typically in a variable manner. The light then passes to a beam splitter BS, in which one part of the light is deflected into a reference light path R, in which a variable optical attenuation unit VOA is arranged. The other part of the light from the transmission light path TP passes further to a dielectric beam splitter SBS, at which the light is deflected to a rotating mirror RM, on the surface of which it impinges at an angle of, for example, 45° with respect to the rotation axis, such that it is deflected there generally at right angles with respect to its direction upstream of the rotating mirror RM as measurement light 21 in the direction of an object to be scanned. The rotating mirror RM is typically rotatable by 360°, as indicated by the arrow 105. Light scattered or reflected at the object and other light proceeding from the object passes jointly as scan light SL in the reception light path RP back to the rotating mirror RM and are transmitted from there to the, depending on the type of embodiment, spectrally selective beam splitter SBS. The light in the reception path RP is then focused by an objective or focusing lens FL, for example onto the optical input of an optical fiber as optical waveguide, from where, just like the light from the reference light path R, it is fed to a detector Det. The illustrated light paths R, TP and RP can be realized largely by light-transferring optical fibers.

The upper part of the scanner 20, said upper part being indicated in a manner enclosed by a dotted line, is mounted on a base 1, relative to which said upper part is horizontally rotatable, as indicated by the arrow 106.

Figure 3:
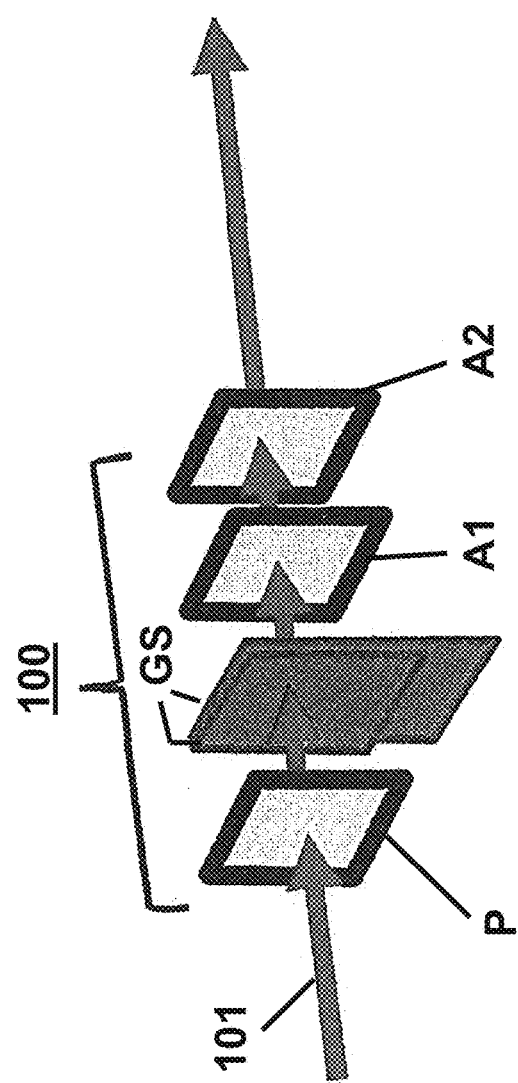
FIG. 3 schematically shows the basic principle of an optical attenuation unit according to the invention.
Figure 4:
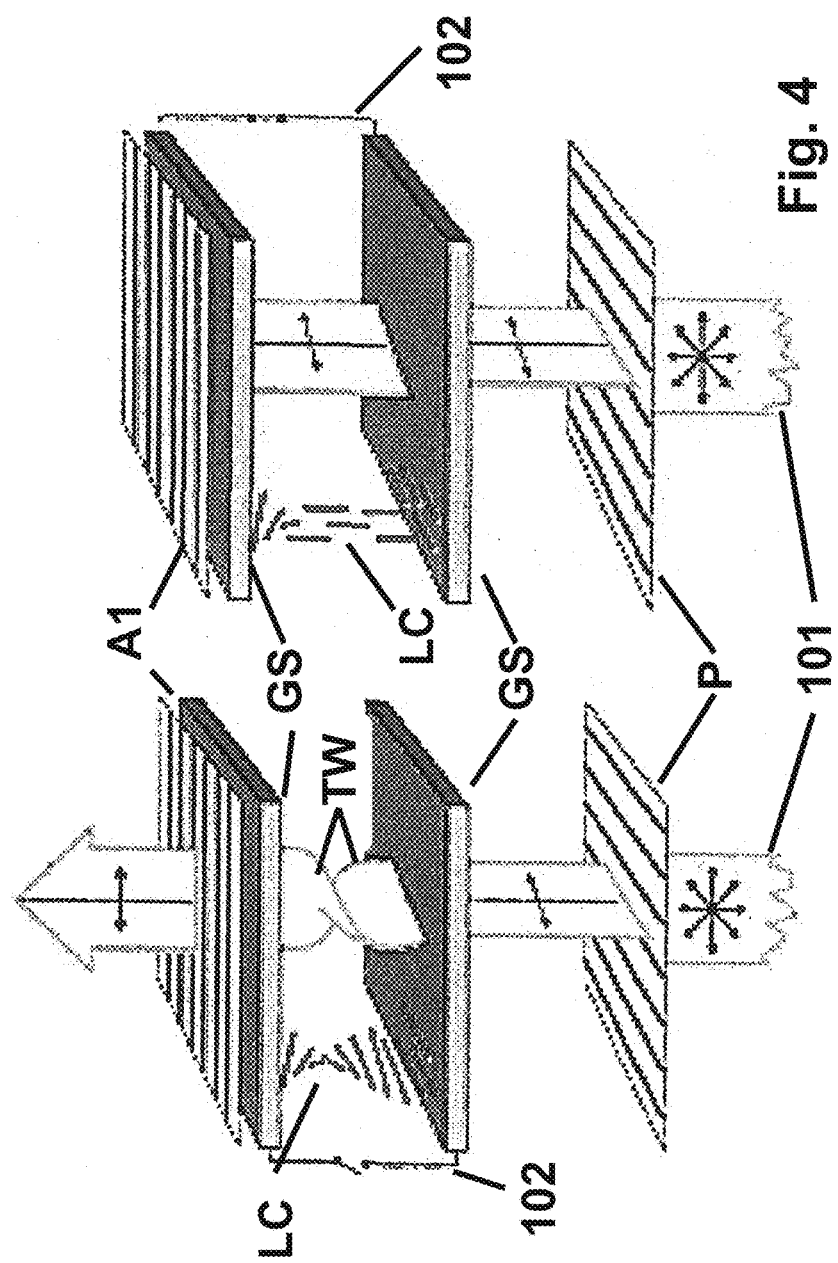
FIG. 4 shows an illustration of the functioning of one preferred embodiment of an optical attenuation unit according to the invention.

FIG. 3 schematically shows the basic principle of an optical attenuation unit 100 according to the invention; the functioning of one preferred embodiment of said attenuation unit 100 is illustrated in FIG. 4. The heart of the attenuation unit 100 is embodied by a liquid crystal shutter (TN-LC) L. The liquid crystal shutter L comprises two substrate glasses GS, also designated hereinafter as "substrate plates" or "cover glasses", which are provided with a thin polymer layer, the molecules of which are aligned by a wiping process. Aligning the molecules by wiping is also referred to as "brushing". The polymer-coated substrate glasses GS are arranged at only a small distance from one another, which is indicated by the mutually offset arrangement in FIG. 3. Liquid crystals, preferably nematic liquid crystals, are arranged between the two substrate glasses GS. In the case of TN cells, the molecules of the liquid crystal align parallel to the polymers situated on the cover glass GS. If the two substrate plates GS are pivoted by 90° relative to one another (which is the case in the example illustrated in FIG. 4), then a helical structure arises in the liquid crystal; in the case of a helix rotated by 90°, as in this example, this is referred to as TN ("twisted nematic").

The rotated nematic liquid crystal has the property that it causes the oscillation plane of linearly polarized light to follow its helical shape. The polarization follows the twist of the chiral structure under certain preconditions (=Mauguin Limit). If an electric field is present at the TN cell, then the molecules align along the electric field and the helical shape disappears. Linearly polarized light is no longer rotated. This specific property makes the TN cell a variable polarization rotator.

Since the switching speed is intended to be high, the distance between the plates is small and the liquid layer is thin.

The left-hand part of FIG. 4 shows the functioning of the TN liquid cell in the absence of an electrical voltage applied to the substrate plates. This is indicated by the interrupted contact line 102 between the two plates. In accordance with the embodiment illustrated, the polarizer P is designed in a self-supporting fashion and the analyzer A1 is designed as a polarization film, also referred to as polarization sheet, adhesively bonded onto the rear side of the second (here upper) substrate plate—relative to the direction of incident light—, wherein polarizer P and analyzer A1 have a linear, mutually crossed polarization. Light which impinges on the polarizer P, and which is unpolarized or circularly polarized, for example, is linearly polarized before it impinges on the liquid crystal shutter L. As a result of the chiral structure of the liquid crystals, in the form of a 90° helix, between the two substrate plates GS, the light polarization is rotated by 90°, such that the linearly polarized light can also pass through the analyzer A1.

The right-hand part of FIG. 4 illustrates the situation in which an electrical voltage is present between the two substrate plate GS (closed contact line 102). The liquid crystals now align along the electric field, and the polarization direction is no longer rotated in the liquid crystal shutter L, and so the light can no longer pass through the analyzer A1.

In accordance with the embodiment illustrated in FIG. 4, therefore, the liquid crystal shutter L is transparent in the rest state, i.e. without applied voltage, and blocks the passage of light when electrical voltage is applied. Therefore, this embodiment or its operating function operates as "normally white mode".

If the polarization filters (polarizer P and analyzer A1) are arranged parallel to one another, then the cell is dark without voltage and becomes transparent only with increasing voltage. This is then referred to as the "normally black mode". Although this type exhibits more symmetrical isocontrast plots (in this respect, also see further below) in relation to the viewing angle or laser angle of incidence, it is inferior to the normally white mode with regard to the maximum contrast in the case of TN-LC cells, and the normally white mode is therefore preferred according to the present invention. A further advantage of the normally white mode in the case of TN cells is that the problem of the temperature drift of birefringence (retardance) of the liquid crystal is practically not present; this is because in the state of maximum attenuation the birefringence of the TN-LC cell in the laser beam direction is not present or is at least minimal. The maximum attenuation is therefore determined predominantly by the polarizer pair, and by properties of the TN-LC cell only in the second order.

Figure 5:
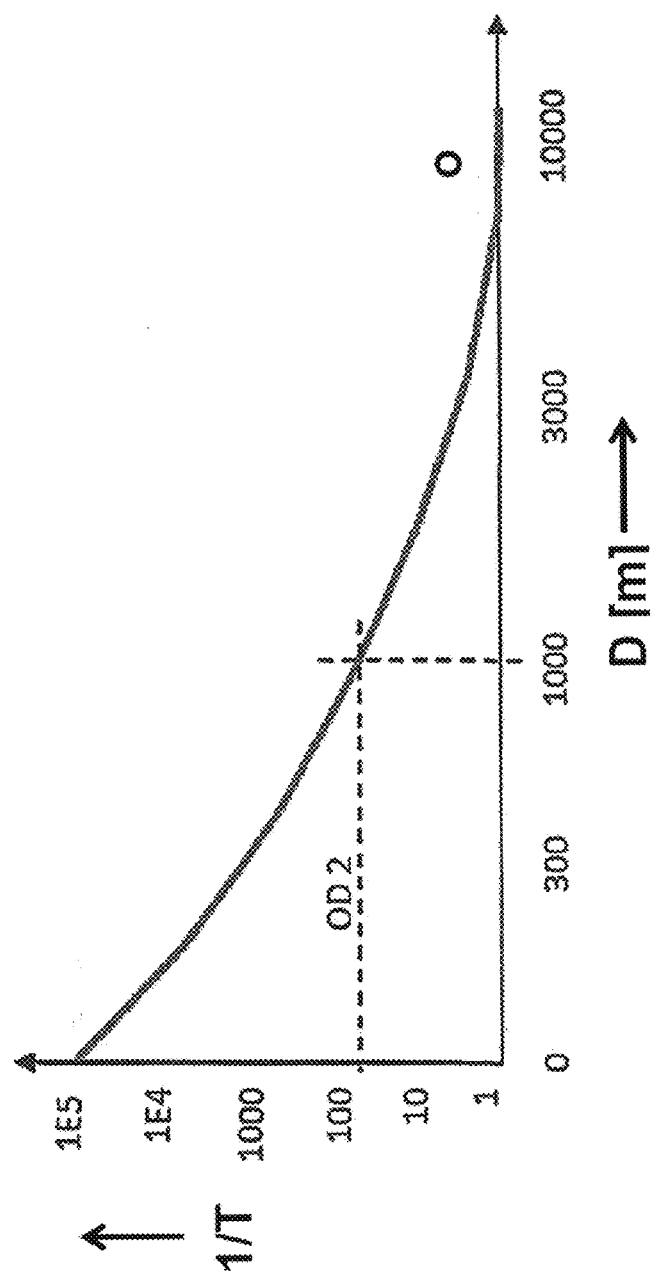
FIG. 5 shows an illustration of the regulatability of the attenuation of a TN-LC cell according to the invention, as a function of the distance to a reflective target.

FIG. 5 illustrates the regulatability of the attenuation, i.e. of the inverse 1/T of the transmission T, of a TN-LC cell according to the invention, as a function of the distance D to a highly reflective target, which distance is to be measured by means of a distance measuring module. In order to attain an evaluatable signal, i.e. without detector saturation, in the case of very close targets, a very high attenuation of 105 has to be set. For more remote targets, the required attenuation becomes smaller and smaller, down to complete transmission (1/T=1), for example for a distance of 10 000 meters. Of course, the transmission in the open state is less than 100%; achievable values are 80%. Therefore, the element has to provide an attenuation of 105/0.80=1.25.105.

Figure 6:
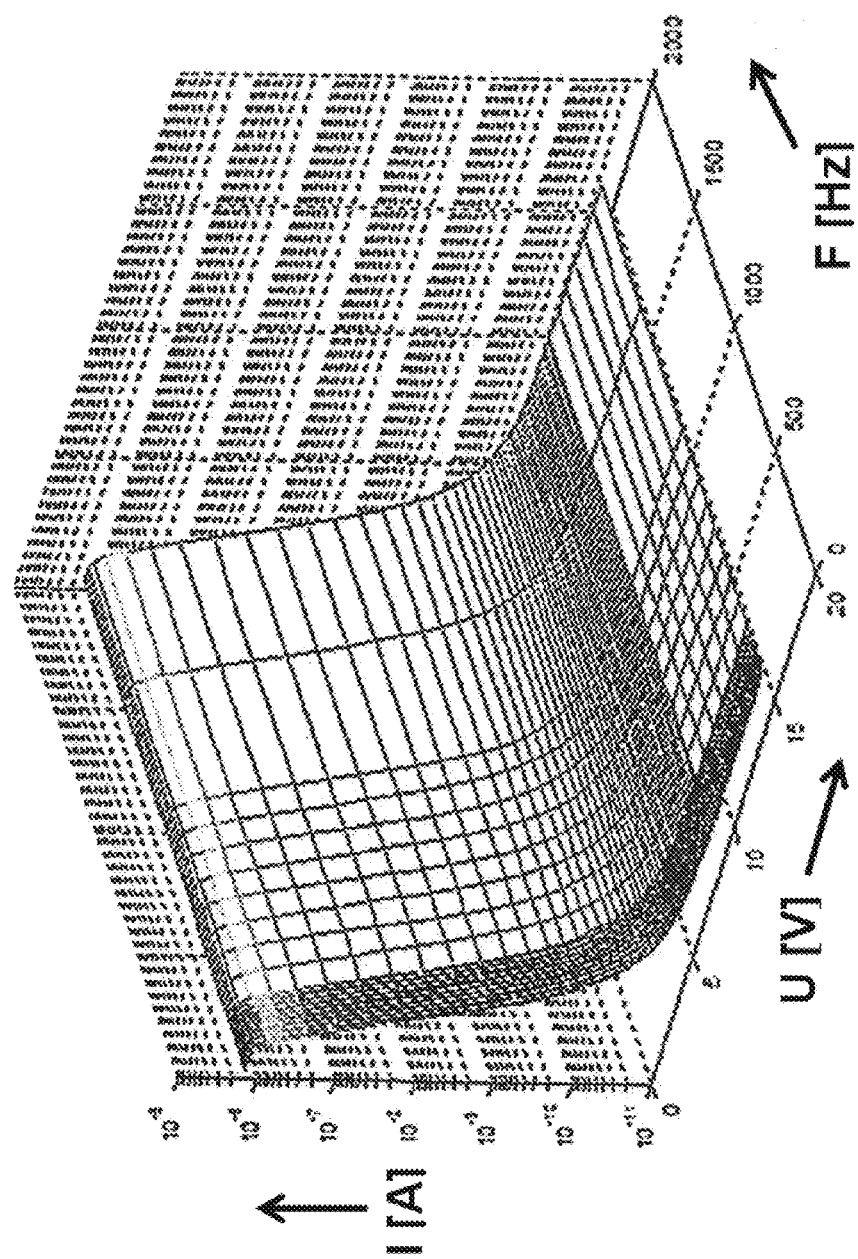
FIG. 6 shows, for a TN-LC cell according to the invention, the measured laser intensity as a function of the voltage applied between the substrate plates of the cell and the drive frequency.

FIG. 6 shows, for a TN-LC cell according to the invention, the measured laser intensity I (in amperes) as a function of the voltage U applied between the substrate plates and the drive frequency F. This illustration also reveals that the LC cell according to the invention enables a regulatable contrast of up to at least $10^5$. A variation of the frequency of the drive voltage F between 100 Hz and 2000 Hz has no significant influence on the optical behavior.

Accordingly, the following arises as a typical manner of operation of a TN liquid crystal shutter according to the invention:

The LC cells are driven with AC voltages in the frequency range of between 20 Hz and 2 kHz. The optimum driving is determined by the temperature. At temperatures of greater than 0° C., the switching speed of the LC liquids is in the milliseconds range, and the optimum drive frequencies are therefore approximately one kHz; at temperatures of below 0° C., better attenuation settings are achieved for drive frequencies of approximately 100 Hz.

Figure 7:
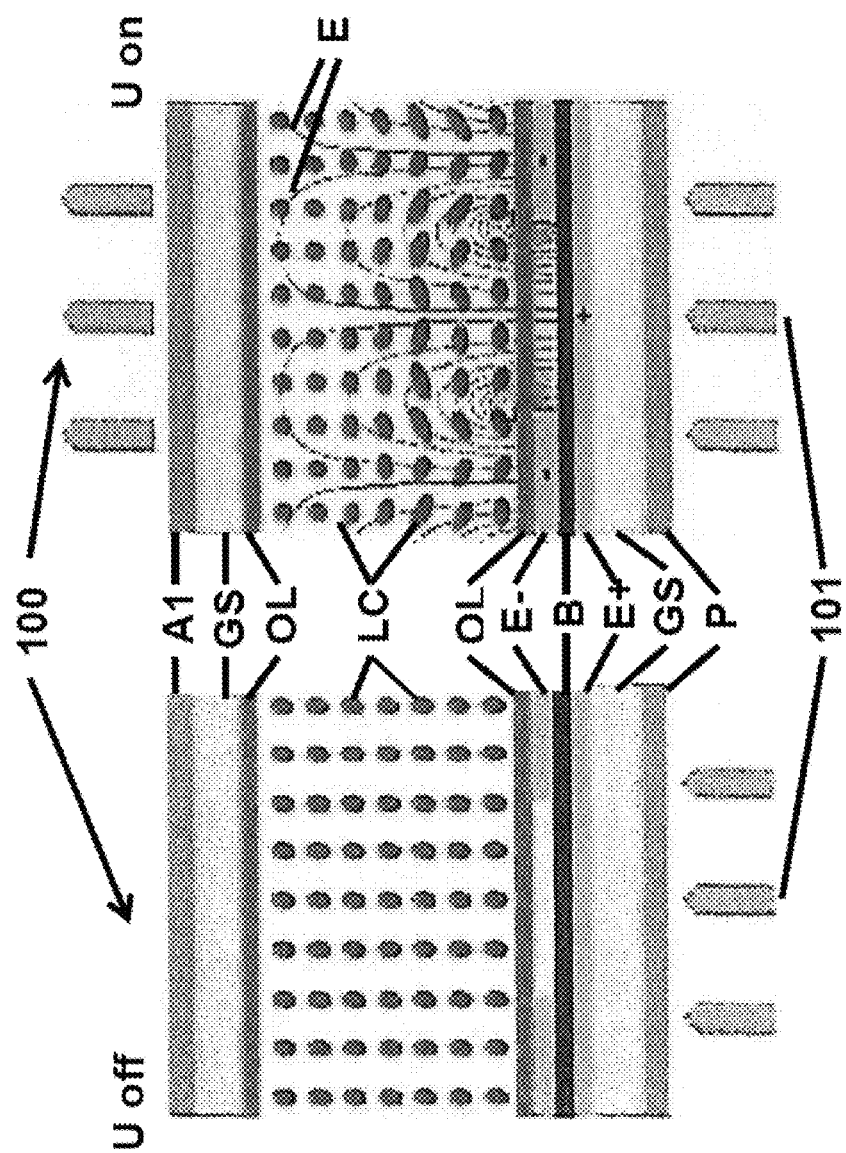
FIG. 7 shows an illustration of the construction of an FFS liquid crystal shutter according to the invention.

FIG. 7 illustrates the construction of an FFS liquid crystal shutter FFSN-LCD according to the invention. FFS stands for "fringe field switching" (in the left-hand part of the figure without voltage applied to the electrodes ("U off"), in the right-hand part of the figure with voltage applied to the electrodes ("U on")). FFS technology is based on a transverse electric field aligned parallel to the substrate or glass surfaces GS of the liquid crystal shutter. The figure shows the cell construction with the electrode configuration, wherein the electrode E+ and the counterelectrode E− are situated on the same side of the cell and are separated from one another by an insulation layer B. In the direction of the liquid crystals LC, the electrodes are in each case coated with a so-called orientation layer OL, which generally consists of polymers. The electric fields E are depicted as lines in the right-hand half of the figure. The very strong field amplitudes at the electrode edges enable effective and fast switching. The electrode configuration generates a higher transmission in the open state in comparison with IPS technology. However, the size of the cell structure is limited. In the case of cells having only a single pixel, as desired for the present invention, the distance between the electrodes becomes large, which leads to high drive voltages U and causes the field strength E at the edge (range) of the strip or hollow electrode to increase to very large values, which fall toward the center of the pixel. In the case of large pixel dimensions in comparison with the liquid thickness, the field in the cell center is practically zero, and the switching or attenuation function is in effect no longer provided there as a result.

In accordance with the arrangement shown in FIG. 7, this liquid crystal shutter is operated in the normally black mode, i.e. the passage of light 101 is blocked in the voltage-free state ("U off"); the cell becomes transparent with applied voltage.

Since a comparably high contrast can be achieved with FFS cells, this cell type in a matrix structure is suitable as a variable optical attenuator (VOA) in reception channels of distance measuring modules. In this case, the matrix structure consists of an array of many, for example 10 to 1000, pixels. In this case, diffraction effects additionally increase the contrast.

Figure 8:
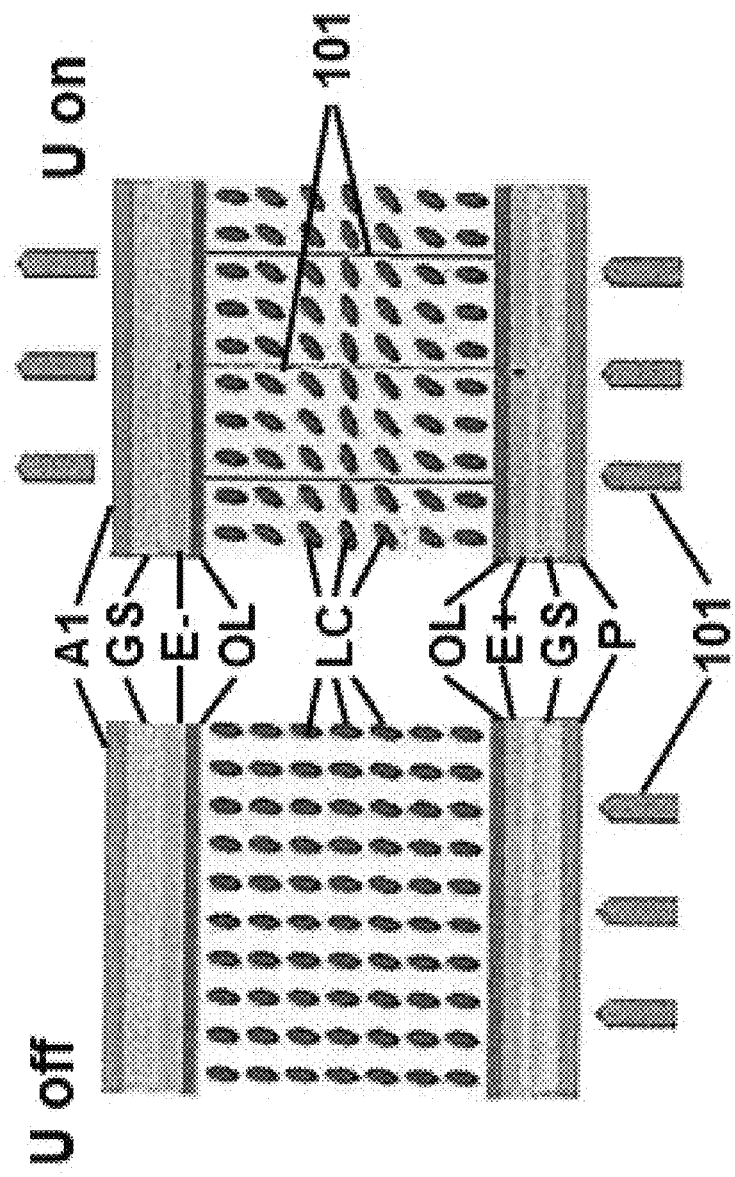
FIG. 8 shows illustrations of the construction of a VA liquid crystal shutter VA-LCD according to the invention.

FIG. 8 illustrates the construction of a VA liquid crystal shutter VA-LCD according to the invention. In the case of VA technology, the liquid crystal molecules LC in the natural arrangement, i.e. in the rest state or without any applied voltage, are vertically aligned with respect to the two glass substrates or glass carriers GS. In the state without a drive voltage U, the molecular axes remain in a perpendicular position relative to their glass plate plane, and in combination with crossed polarizers the transmission is minimal ("black" or "normally black"). As an applied electrical voltage U is increased, the molecules rotate out of this vertical position. The greater the tilt angle of the LC molecules, the greater the transmission becomes. Grayscale values and thus the desired optical densities can be set as a result. In order that the liquid crystal molecules LC rotate out of the electric field lines under the action of an electric field E, liquid crystal mixtures having negative dielectric anisotropy $\Delta\varepsilon<0$ are required for VA cells.

Without an electrical voltage U present, the molecules are aligned almost ideally along the optical beam axis. The light polarization is not altered in this case, which leads to a high contrast in combination with crossed polarizers, and light 101 entering the cell cannot pass through the cell (T=0). With increasing electrical voltage U, the molecules rotate out of the beam axis, and thus so does the refractive index ellipsoid anchored with the molecular structure. Birefringence starts to take effect, and the laser beam 101 traversing the liquid experiences a change in polarization, as a result of which the transmission increases upon passing through the first analyzer A1. VA screens are normally operated in the normally black arrangement (as illustrated here) owing to the high contrast, which means that the LC element is nontransparent in the absence of an applied electrical voltage.

Figure 9:
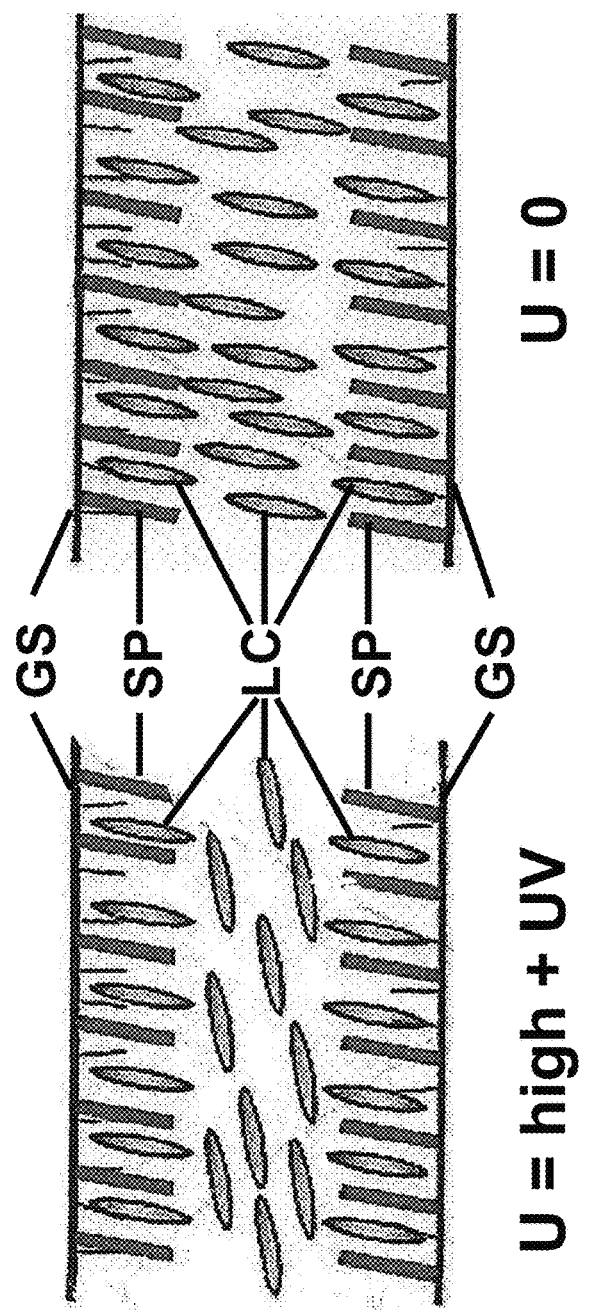
FIG. 9 shows an illustration of a mixture of liquid crystal molecules comprising electrically polar stabilizing polymers and an associated production method.

In order that the liquid crystal molecules LC align perpendicularly to the two substrate glasses GS in the state without an electrical voltage, said substrate glasses are provided with electrically polar stabilizing polymers SP. This is shown in FIG. 9. The figure additionally indicates a possible production process in which the electrically polar supporting molecules are aligned by means of a high applied electrical voltage and are converted into the solid state in this case by means of polymerization owing to irradiation by UV light ("U=high+UV"). In this case, the liquid crystal molecules have a length of approximately 2 nm to 5 nm, while the polymer molecules typically have a length of approximately 100 nm.

Figure 10:
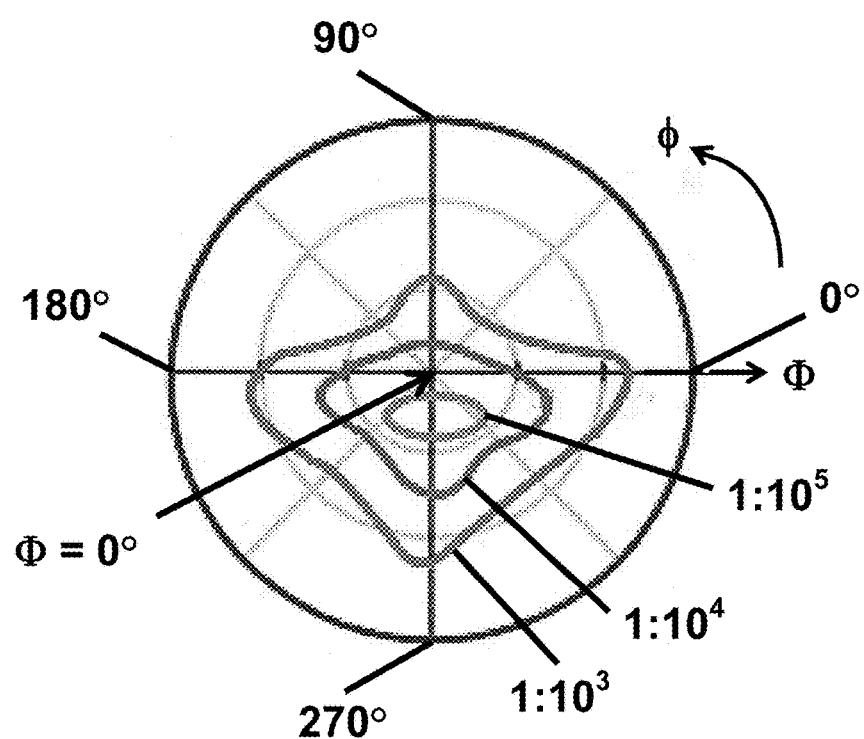
FIG. 10 shows an illustration of the angle dependence of the contrast (viewing angle) of TN-LC cells.

FIG. 10 illustrates the angle dependence of the contrast (viewing angle) of TN-LC cells) (90°. The viewing angle dependence of the contrast corresponds to the laser incidence direction and is typically shown in the form of such so-called "isocontrast curves", wherein the angle between the normal to the LC cell and the laser beam (=polar angle Φ) and the azimuth angle (=rotation angle φ) are used as coordinates. The polar angle is zero in the direction of the polarizer of the cell. The profile is not rotationally symmetrical, but rather exhibits for the isocontrast curves for the lines succeeding one another from the inner area outward for contrast values of 1:105, 1:104 and 1:103, which in each case represent zones having identical contrast, a shift deviating from the polar angle 0° as to therefrom. In accordance with this illustration, the region of the greatest contrast is present below the center on the straight line with azimuth angle 270°.

FIG. 11 illustrates the mode of action of a specific polymer layer applied on the glass substrates GS of the TN cell of a liquid crystal shutter L according to the invention. In accordance with this example, the transparent electrodes on the glass plates GS delimiting the TN-LC cell consist of indium tin oxide (ITO). Situated above the ITO electrodes is an approximately 10 nm thick, wiped polymer layer OL acting as an orientation layer for the liquid crystal molecules. The molecules of the polymer layer are not arranged in a plane isotropically parallel to the glass substrates GS, but rather have a so-called pretilt angle ε. This angle is always aligned in the wiping or rubbing direction, which is identified by large double arrows 103, 104 in the left-hand part of FIG. 11. The rod-shaped liquid crystal molecules align parallel and adhere to the molecules of the polymer film. Owing to the pretilt angle ε at the polymer binding sites, by way of example, only a helix in the clockwise direction through the liquid can form. A helix in the counterclockwise direction is then not possible.

This pretilt angle ε also influences the alignment of the helix axis and thus tilts the optical axis of the birefringent liquid by a certain angle with respect to the cover glass normal (substrate). This tilting of the helical molecular chains produces a phase retardation between the two polarization directions, such that the polarization at the output of the TN cell acquires an elliptic portion and the contrast decreases as a result. The isocontrast curves are then no longer symmetrical with respect to the surface normal of the TN cell. In addition, the transmission characteristic curve as a function of the applied voltage essentially depends on the angle of incidence of the laser beam on the TN cell. In the case of the VA cell type, such an asymmetry of the isocontrast plot is generally not present.

Figure 12:
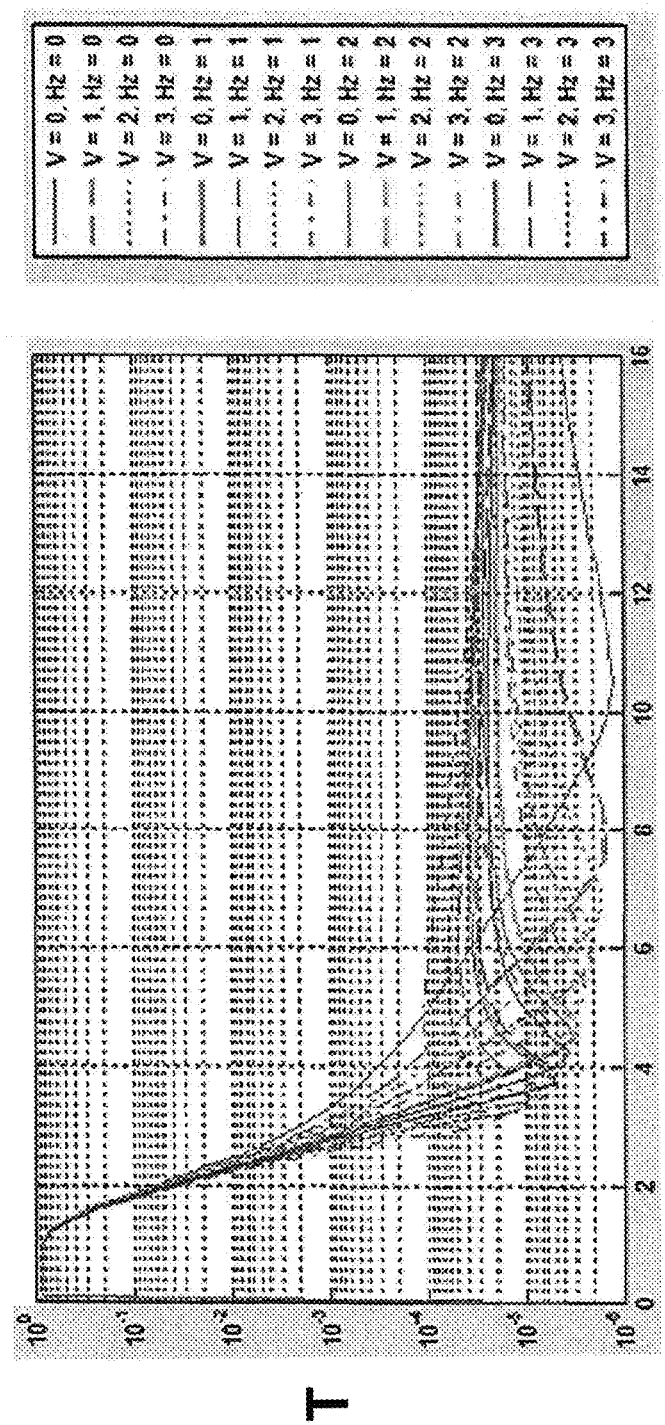
FIG. 12 shows an illustration of electro-optical characteristic curves for various laser angles of incidence on the basis of a plotting of the transmission as a function of the voltage U applied to the TN cell for various viewing angles.

FIG. 12 shows electro-optical characteristic curves for various laser angles of incidence. The transmission T between 1 and $10^{-6}$ is plotted as a function of the control voltage U (in V) applied to the TN cell for viewing angles (azimuthal, polar or horizontal, vertical) of (0°, 0°) to (+3°, +3°).

The alignment of the TN-LC attenuator with respect to the laser beam also influences the transmission characteristic curve as a function of the applied voltage.

In these measurements, a TN cell was aligned exactly perpendicularly to the laser axis (Z-axis) and inclined in a matrix-like manner in both directions, that is to say in the Hz and V directions, step by step from 0° to +3°. The intensity characteristic curve changes with the tilting of the LCD. In this case, the local minimum shifts along the voltage axis, and the minimum value of the transmission likewise changes.

From this illustration, the following can be derived as conclusions from an erroneous alignment of the TN-LCD with respect to the laser beam: firstly, the achievable contrast changes; secondly, the transmission-voltage characteristic curve also changes.

This significant dependence of the LCD characteristic curve with respect to the alignment of the TN-LCD is an important aspect which must be taken into account when a TN liquid crystal shutter is incorporated into an EDM module; in particular, the necessity for careful adjustment of the cell becomes clear from this.

It is evident from the graphic diagram above that maximum attenuations of higher than OD5 ($10^5$) are achievable with TN-LC cells. In this case, care should be taken to ensure that the attenuator element is incorporated into the EDM module in a manner tilted in Hz and V directions in the correct alignment with respect to the laser beam.

Particularly for TN-LC cells that achieve a high contrast, a scattered light problem furthermore arises as a result of—mixed into the liquid—glass fibers, plastic fibers or glass beads for fulfilling a function as spacers between the glass plates. The breadth of the plate spacing is defined by the laser wavelength and the birefringence (retardance) of the liquid crystal (Gooch-Tarry curve).

According to the invention, cylindrical spacers having the shortest possible length of between 3 µm and 10 µm are used in this case for reducing the generation of scattered light. Alternatively, small glass beads are also used; the latter have the advantage of much smaller dimensions and area proportions than the small cylindrical rods, as a result of which even less scattered light is generated during the passage of a laser beam. In addition, care is taken to ensure that the refractive indices of spacers and liquid crystals at the used wavelength correspond as well as possible.

The use of the smallest possible spacers (short fibers or small glass beads) is not common practice commercially. Therefore, standard liquid crystal cells in which customary larger spacers are used are unsuitable for attenuators having high contrast, corresponding to the optical qualities striven for by the present invention.

Figure 13:
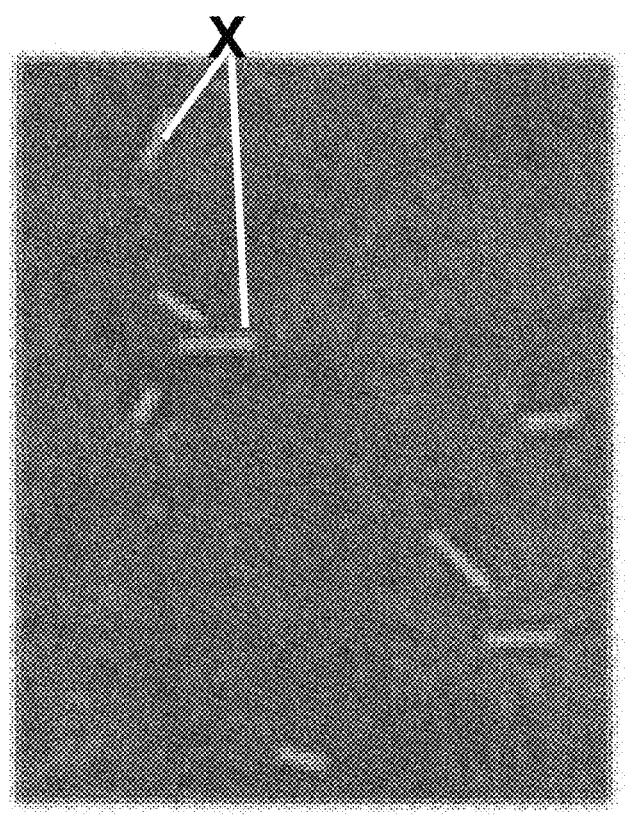
FIG. 13 shows micrographs of a TN liquid crystal cell comprising a mixture of liquid crystal molecules with spacers in transmitted light, without combination of the TN-LCD with polarizers.

FIG. 13 shows a micrograph of a TN-LCD in transmitted light, without combination of the TN-LCD with polarizers.

Small white rods X as spacers can be discerned in the micrograph. The fibers have a large dimension 3.9 µm×27 µm and are clearly visible, which demonstrates that they scatter light to a considerable extent. A cell comprising such large spacers and additionally also such a large number of such spacers is unsuitable for a component according to the invention.

A different embodiment of an LC cell, one which is suitable for the invention, having little scattered light and high contrast has no spacers on the free optical opening, and the spacers in this case are positioned exclusively in the outer region of the cell that is not used optically.

Figure 14:
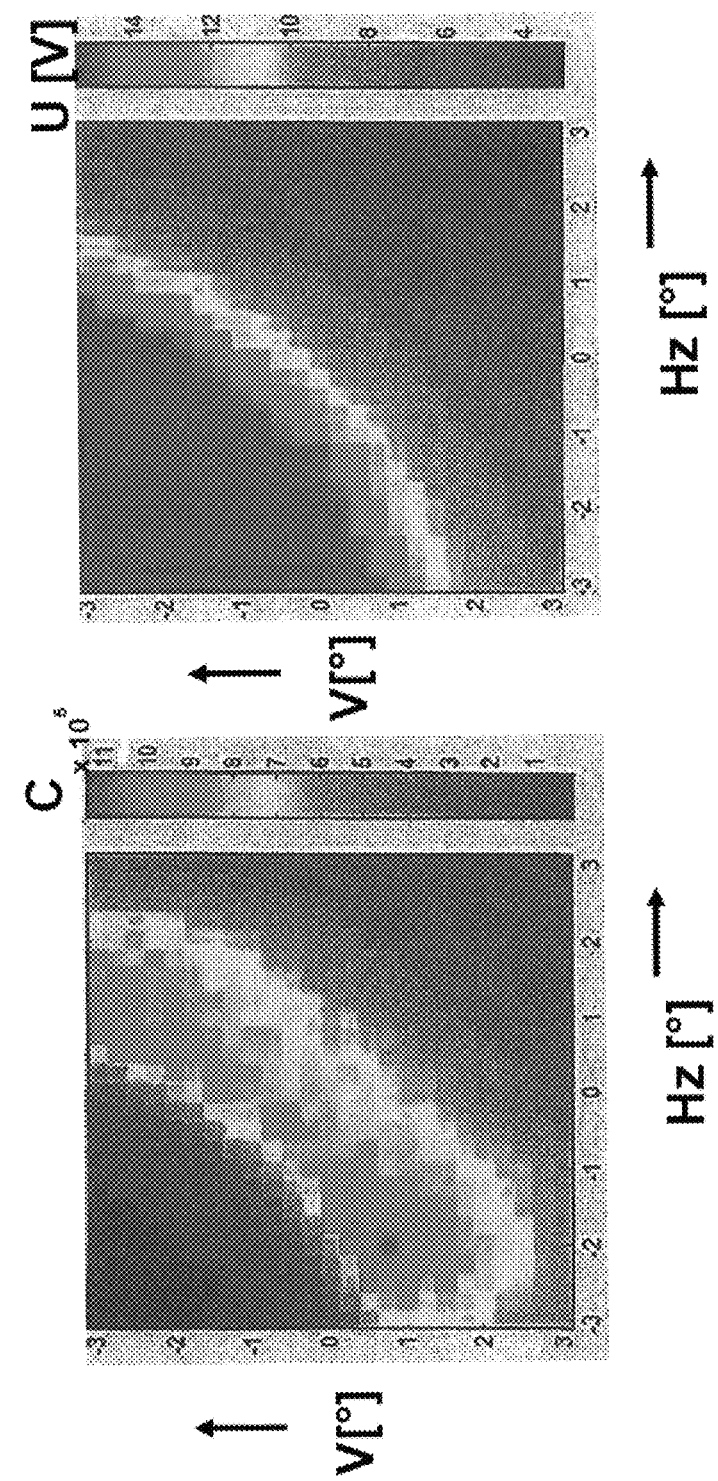
FIG. 14 shows an illustration of the contrast behavior of a TN-LC attenuation unit according to the invention.

FIG. 14 illustrates the contrast behavior of a TN-LC attenuation unit according to the invention in further forms of representation. The left-hand part of the figure shows in a so-called isocontrast plot, in the manner of a contour line representation, measurement results for the influence of the alignment of the TN-LC attenuator with respect to the laser beam on the contrast over the angular range (Hz, V) of (−3°, −3°) to (+3°, +3°), represented as horizontal and vertical axes, respectively, of the graph, and values of the measured contrast (corresponding to contour lines) in the right-hand bar chart.

In the case of perpendicular laser incidence on the LC cell, very high attenuation or contrast values of up to $10^5$ can be achieved with suitably accurate alignment of the polarizers. However, if the cell is only slightly tilted with respect to the laser beam, then the attenuation decreases significantly. Such behavior is known from television screens and is referred to in the technical jargon as "light leakage at oblique incidence".

For every type of LC cells, and in particular for TN-LC cells, it is therefore important to take account of the isocontrast plot and to set the optimum angle of the cell with respect to the laser beam.

The highest contrast values can thus be achieved in a band of the angular range (Hz, V) of (−2.5°, +1.5°) to (+1°, −2.5°).

However, the highest contrast values ought not already be achieved at excessively low drive voltages; otherwise, the characteristic curve is too steep and the setting accuracy is inaccurate. Therefore, yet another representation of the contrast dependence is also essential for cell optimization. The right-hand part of FIG. 14 illustrates, once again as a function of the horizontal and vertical angles, at what voltage the maximum contrast values were achieved.—This illustration reveals that, at a voltage of 10 V to 14 V, the angle ranges (Hz, V)=(−3°, +1°) through (0°, 0°) to (+1°, −3°) are best suited to the application as an electro-optical attenuator.

Figure 15:
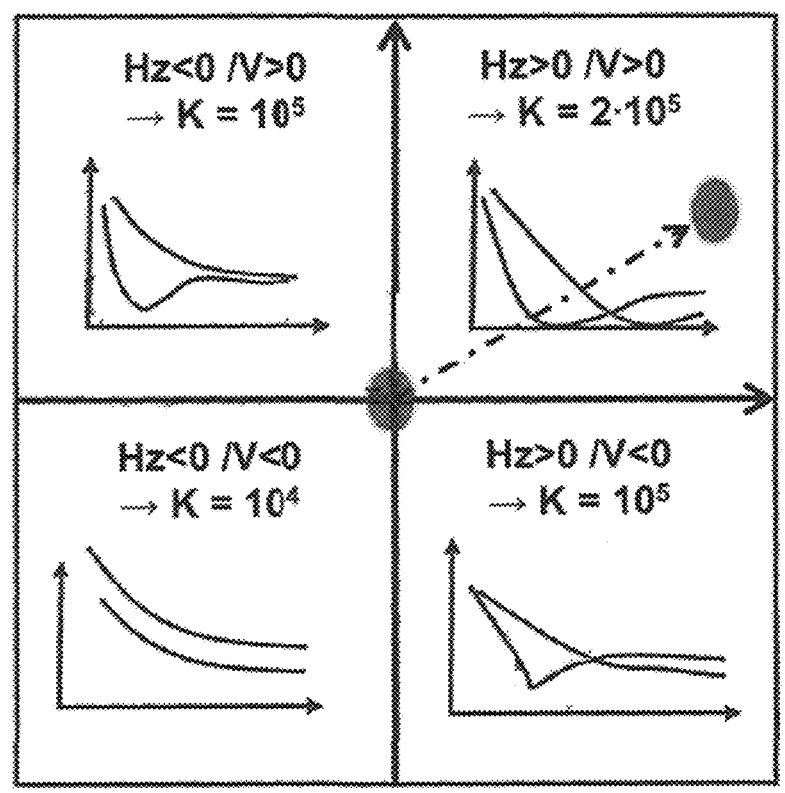
FIG. 15 shows a qualitative illustration of the influence of the LCD tilt angle with respect to the laser beam direction.

FIG. 15 shows for a TN cell a qualitative illustration of the influence of the tilt angle with respect to the laser beam direction on the profile of the characteristic curve, divided according to the four angle quadrants (Hz<0,V>0; Hz>0 V>0; Hz<0,V<0; Hz>0,V<0) of the laser angle of incidence. This illustration should be compared with FIG. 14, where it should be noted that the illustration is in an identical way with regard to the "V" angle, but is mirrored at the "0° line" with regard to the "Hz" angle.

The ellipse, as an identification for the tilting of the LC cell away from perpendicular impingement of the laser beam on the LC cell, marks the laser back-reflection LR from the cell back in the direction of the laser source, said laser back-reflection being dependent on the tilting of the LC cell.

If monotonicity and sufficient gradient tolerance and angle tolerance of the characteristic curve are of primary importance, then in accordance with this illustration the best alignments of the LC cell with high contrast can be found in the angle quadrants at the top left and bottom right. If, on the other hand, maximum attenuation and thus maximum contrast of the characteristic curve are of primary importance, then in this figure the optimum angle in the angle quadrant at the top right is best suited; this is because in general the highest contrast values are localized in said angle quadrant.

FIG. 16 summarizes in tabular form the method according to the invention for producing a liquid crystal shutter according to the invention of the "twisted nematic" type. This particular production method was developed in order to be able to produce an LC attenuator according to the invention having the required high possible contrast values of up to $10^5$ or higher. In particular, the method according to the invention was tried out and investigated for producing TN-LC cells. The various alignments during mounting are preferably measured and monitored by means of an auxiliary laser source.

In the first step of the method, the liquid crystal cell is arranged between the positions for the polarizer P and the first analyzer A1 in the excitation beam path as accurately as possible perpendicularly or at some other accurately defined polar angle of incidence with respect to the optical axis of the incident laser beam 101 (also see FIG. 3). In this case, a Glan-Thompson prism (GTP) is initially used as an aid typically at the position of the analyzer A1. The LCD then acts like a glass plate. The LCD is driven for example with a 16 V(pp)/0.2 . . . 2 kHz rectangular voltage. As a result, the polarization remains largely uninfluenced by the cell.

According to Malus' law, the optically active axes of polarizer, analyzer and auxiliary analyzer (GTP) should be mutually aligned to an accuracy of 0.1° or better (see step 4). Accordingly, step 2 demands that the angular alignment about the laser axis of the LC cell relative to the polarizers is correct to +/−1.5 . . . 2°. Otherwise, a TN cell also acts as an optical phase plate, which reduces the contrast. The maximum attenuation is lower by 20% in the case of rotation by +/−2°, and 100% worse in the case of a rotation by +/−5 . . . 6°.

In step 3, the polarizer P is then adhesively bonded or optically cemented onto that side of the first glass substrate plate which faces the beam path. In this case, adhesive bonding is preferred, in particular with the use of an adhesive film already present on one side of a polarizer P designed as a polarization sheet.

In step 4, the first analyzer A1 is positioned in the beam path instead of the Glan-Thompson prism initially used.

In step 5, the analyzer A1, in order to change its polarization alignment, is then rotated about the optical axis of the incident laser beam until the detector signal attains a minimum value. Then, i.e. with crossed alignment of the linear polarizations of polarizer P and analyzer A1, maximum attenuation is achieved by means of voltage applied to the TN-LC cell.

Preferably, in a step 6, the analyzer A1, designed in particular as a polarization sheet, especially with a single-sided adhesive film, is then adhesively bonded onto the rear side of the second glass substrate plate, in the direction of the light emergence from the LC liquid crystal shutter.

An individual LC attenuator, consisting of polarizer, TN-LCD and an analyzer, can have an excessively low attenuation, with a maximum achievable contrast of, for example, only 80,000 instead of greater than 100,000. Therefore, a second embodiment comprising a second analyzer in a serial arrangement is advantageous, i.e. a second analyzer is inserted in the beam path behind the first analyzer.

In the optional further steps for a second embodiment of the production method according to the invention, in this respect, in step 7, a second analyzer A2 is arranged, with voltage switched off.

In the final step 8, the analyzer A2 is then rotated about the optical axis of the laser beam until the signal of the light passing through the laser beam, with voltage still switched off at the LCD, attains a maximum.—An accuracy of ±1° . . . ±5° is desirable in this second rotation step. This adjustment is less critical, since the second analyzer is substantially only provided for compensating for errors in the positioning of the analyzer A1, in order actually really to be able to achieve a possible contrast of greater than 105, as required.

An LC attenuation unit according to the invention, in particular a TN-LC cell in "normally white" arrangement, is completed by the preceding production steps.

In accordance with one particular embodiment of the production method according to the invention, therefore, this method is based on the following (structural) features:

The LC attenuator described here consists of:
an adhesively bonded polarization sheet P, self-adhesive on one side and coated with an antireflection layer on one side;
an LCD shutter L;
a first adhesively bonded analyzer sheet A1, self-adhesive on one side and not coated with an antireflection layer;
optionally in addition a second adhesively bonded analyzer sheet A2, self-adhesive on one side and coated with an antireflection layer on one side, wherein the two analyzers A1 and A2 are both arranged at the output of the optical beam (downstream of the LC cell in the optical path).

In the construction of these TN-LC cells, birefringent compensation films were intentionally dispensed with in order to keep the transmission in the open state as high as possible. It is true that dielectric anisotropy particularly of the LC liquid limits the high attenuation factor to a specific direction of incidence, and display technology discloses both uniaxial and biaxial phase retardation films combined with positive and negative birefringence as polarization compensators which extend the angle range. By way of example, A-films having an in-plane optical axis and/or C-films having an optical axis aligned perpendicularly to the film plane are customary. The angle range with maximum attenuation can thereby be symmetrized and extended. With an extension of the isocontrast diagrams, the installation tolerances of the attenuation element are also relaxed. However, the considerably reduced maximum transmission and the complexity of the component are disadvantageous. The maximum transmission of the TN-LC element in the open state would fall below 60% with the compensation films mentioned and, as a result, would not be as suitable as an attenuator according to the invention for a distance measuring module of a geodetic measuring apparatus.

Instead of plastic-based polarization films (absorbent, reflective, nanowires, etc.), it is also possible to use other types of polarizer known to the person skilled in the art, such as polarizing prisms, Brewster plates, or dielectrically coated splitters.

The preceding figures were oriented to the illustration of attenuation units with input light entering the liquid crystal with—albeit not necessarily exclusively—linear polarization. An alternative embodiment to the TN-LC cells described above is for the LC element to be equipped with circular instead of linear polarizers. The circular polarizers typically substantially consist of a combination of a linear polarizer with a λ/4 phase plate.

Figure 17:
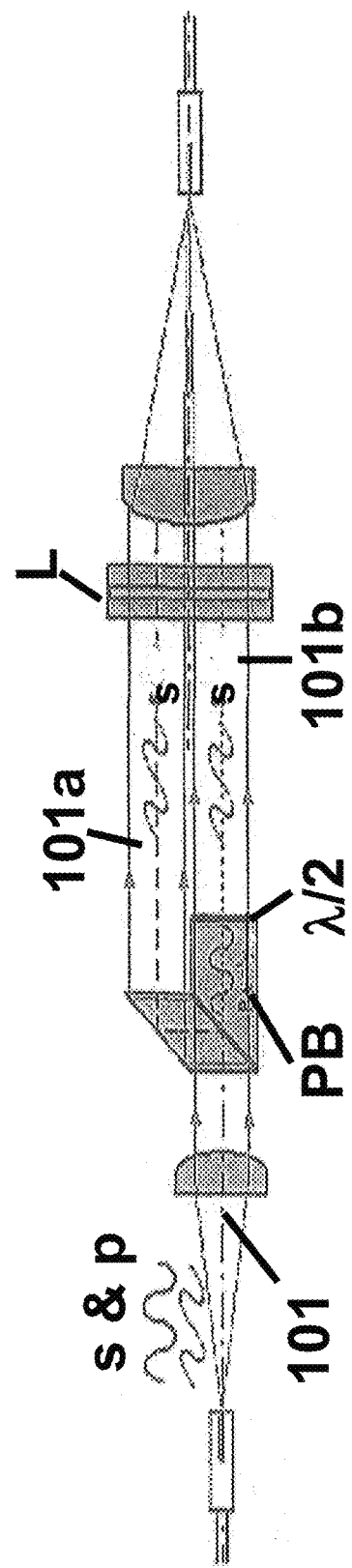
FIG. 17 shows one embodiment of an optical attenuation unit according to the invention with mixed-polarized (s-polarized and p-polarized) input light.
Figure 20:
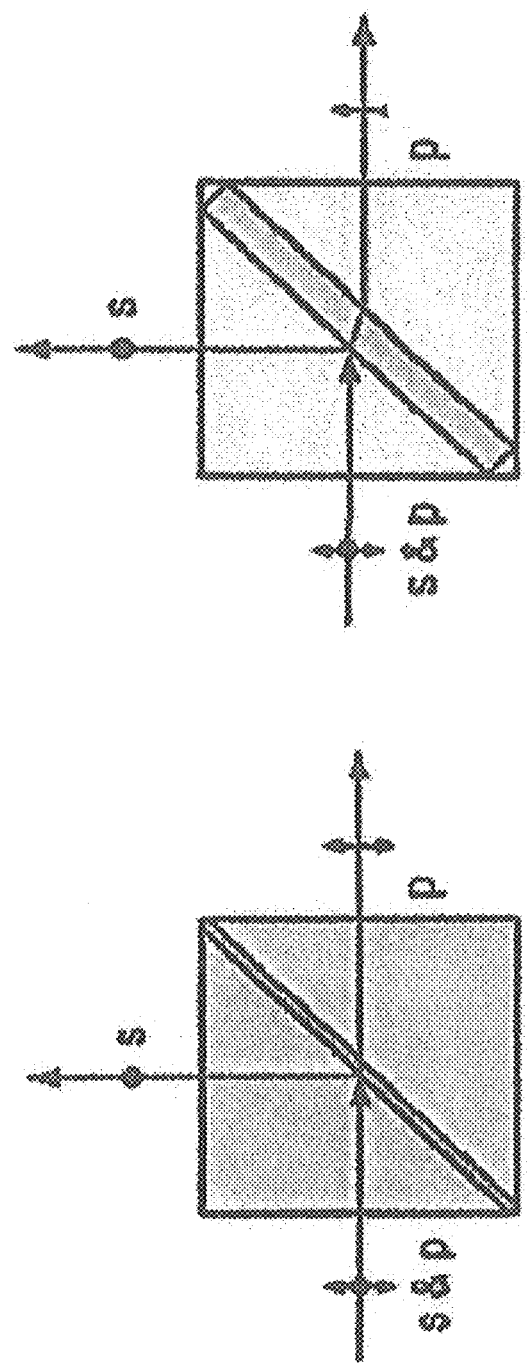
FIG. 20 shows examples of polarization-selective beam splitters PB for splitting an unpolarized reception radiation.

FIG. 17 shows one embodiment of an attenuation unit which has a polarization-free effect and, as a result, can also be used on the receiver side. The reception light guided via an optical fiber is parallelized by a lens. The reception light 101 is a mixture of s-polarized and p-polarized radiation. The mixed-polarized light impinges on a polarization-selective beam splitter PB, designed as a thin-film cube polarizer, which splits the incident light into two mutually perpendicularly polarized portions (s and p) as partial beams 101a and 101b in mutually perpendicular planes.—Possible embodiments of the polarization-selective beam splitter PB are shown in FIG. 20.—A λ/2 plate is arranged downstream in the beam path, such that the polarization of the downstream partial beam 101a corresponds to that of the other partial beam 101b. Therefore, a single liquid crystal shutter L extending over the beam cross sections of both partial beams suffices for the attenuation or contrast regulation.

Figure 18:
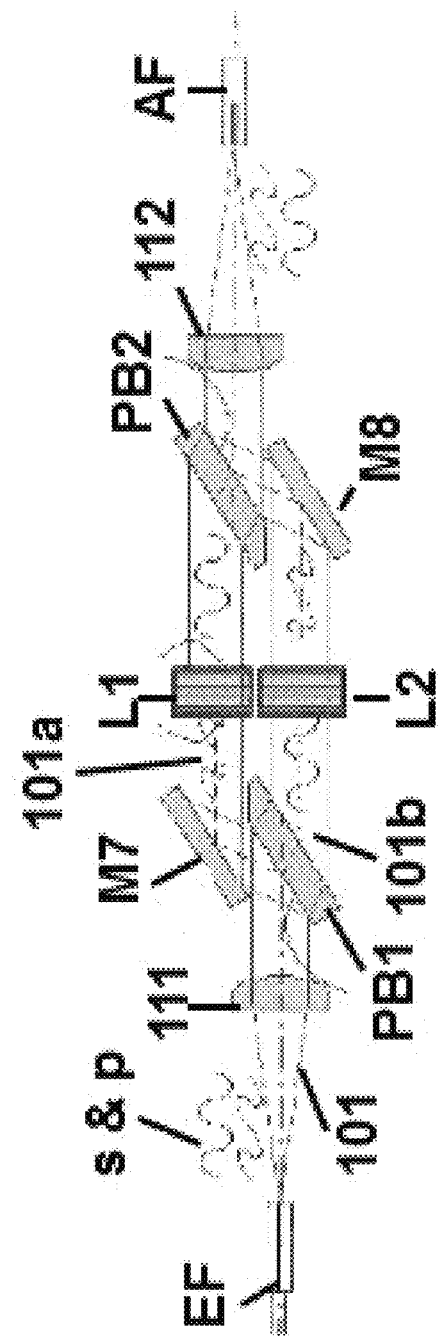
FIG. 18 shows a further embodiment of an optical attenuation unit according to the invention with mixed-polarized (s-polarized and p-polarized) input light.

FIG. 18 shows a further embodiment of an attenuation unit for a mixture of s-polarized and p-polarized reception light, which is provided via a feeding optical fiber (reception fiber EF) in the case illustrated. The reception light 101 is parallelized by means of a lens 111 and then impinges at an oblique angle on a first polarization splitter PB1, i.e. on a glass plate PB1 mounted at the Brewster angle with respect to the reception radiation. There the light, in accordance with the two polarization directions s and p, is proportionally transmitted or reflected onto a simple mirror M7 mounted approximately at the same angle as the polarization splitter PB1 with respect to the direction of the parallel reception light 101 coming from the lens 111. The light then reflected further by the mirror M7 passes as partial beam 101a further to a liquid crystal shutter L1, and the light transmitted by the polarization splitter PB1 passes as partial beam 101b to a second liquid crystal shutter L2, which is arranged in the beam path in a manner rotated at 90° with respect to the first liquid crystal shutter L1.

The light is therefore split in accordance with the two polarization directions and then attenuated by the two liquid crystal shutters L1, L2 separately from one another in a settable manner. Then following further in the beam path there is a further combination of a glass plate PB2, which is mounted at the Brewster angle with respect to the light propagation and acts as a second polarization splitter, and a further mirror M8, mounted approximately parallel to the polarization splitter PB2. By means of this second combination, composed of polarization splitter PB2 and mirror M8, the two partial beams previously separated from one another and attenuated separately from one another are combined again to form a common beam, which is directed via a lens 112 onto the reception opening of a further optical fiber AF for the purpose of guiding the light further to a photodetector, for example a photodiode.

The reception surfaces of the beam splitters PB1, PB2 facing the impinging light are preferably embodied in each case as polarizing mirror surfaces.

The low-loss LC attenuation unit described here (light loss typically 20%) therefore has the following characterizing features:
- The polarizing components are in each case mounted at an oblique angle, i.e. of not equal to 90° with respect to the light propagation direction.
- The arrangement takes effect for both polarization directions and is therefore also suitable for use in the reception channel because the light reflected back from the target object is no longer polarized 100%. (The degree of polarization is between 50% and 100%.)
- This example illustrates an arrangement of the attenuation unit between two light fibers (input fiber EF and output fiber AF); however, the attenuation unit can be used also and without lenses in a light free-radiating arrangement.

Figure 19:
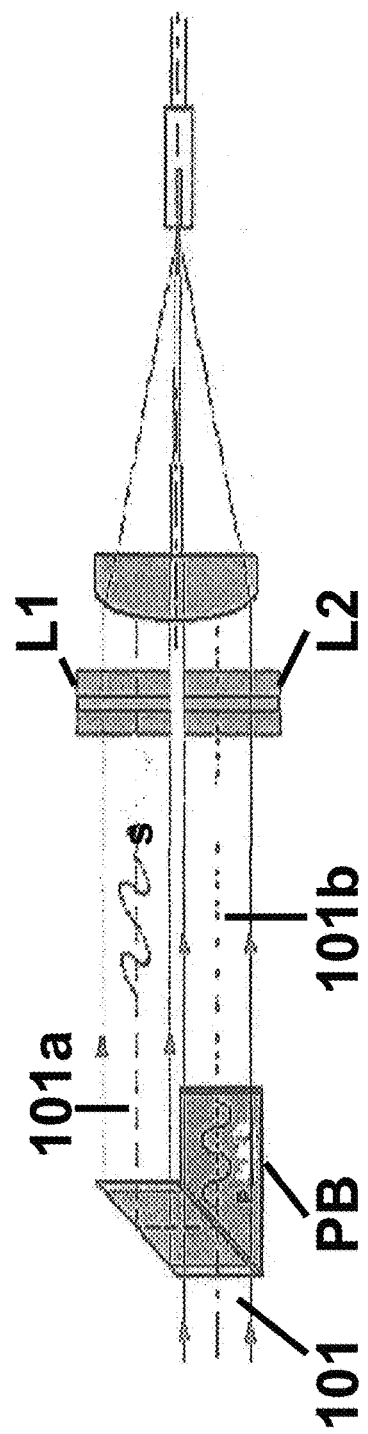
FIG. 19 shows an alternative embodiment to the embodiment from FIG. 18 of an optical attenuation unit according to the invention with mixed-polarized (s-polarized and p-polarized) input light.

FIG. 19 shows an alternative embodiment to FIG. 17 of an attenuation unit, which differs from that from FIG. 17 in that, rather than a λ/2 plate, two discrete liquid crystal shutters L1 and L2 are disposed downstream of the thin-film cube polarizer as polarization-selective beam splitter PB in the beam path, and light having different polarization in the two partial beams 101a and 101b is thus fed to said liquid crystal shutters. With regard to this embodiment, in the same way as for the embodiment in the preceding FIG. 18, it is important that the light paths downstream of the thin-film cube polarizer have identical optical lengths and thus identical propagation times.

An attenuation unit similar to that in FIG. 19 can also be used in an electronic distance measuring module (EDM) with a liquid crystal shutter both in an optical transmission channel and in an optical reception channel, and with TN liquid crystal cells and linearly polarized reception light. By way of example, this is an embodiment comprising a transmitter-side attenuation unit (as in FIG. 3) and two reception-side attenuation units having a polarization-selective behavior (as in FIG. 19). All three elements are embodied as LC elements having a TN structure in accordance with this example. In this case, a polarization-sensitive beam splitter is again disposed upstream of the two LC cells in the reception channel, such that the appropriate polarization is fed to the respective LC element.

Analogously in accordance with a different embodiment of an EDM according to the invention, an attenuator combination can be used in an arrangement similar to that from FIG. 18, in accordance with this example comprising a transmitter-side attenuation element according to FIG. 3 and a single reception-side attenuation element having a polarization-selective behavior as in FIG. 17. Both elements are embodied as LC elements having a TN structure. A polarization-sensitive splitter is again disposed upstream of the LC element in the reception channel, wherein one output channel of the splitter is followed by a λ/2 plate in order that the polarization corresponds to the first output. As a result, a single LC element having a doubled area is again sufficient in the downstream beam path. Instead of LC elements based on TN topology, it is also possible to use LC cells functioning according to the VA or FFS principle.

FIG. 20 shows, as examples of polarization-selective beam splitters PB for splitting an unpolarized reception radiation, a cube and a thin-film polarizer on a glass plate, having in each case an active beam splitter surface arranged at 45° with respect to the direction of the incident light. The beam splitters PB here are arranged such that p-polarized light in each case—relative to the image plane—of the direction of the incident light is transmitted substantially without being deflected, while s-polarized light is deflected at an angle of 90° with respect thereto.

As illustrated in FIG. 18, however, the beam splitting angle can also differ from 90 degrees. If the polarizing beam splitter simultaneously performs the function of the entrance-side polarizer of the LC cell, then the extinction or splitting ratio has to be sufficiently high, namely greater than $10^5$. Polarizing splitters having such a high splitting ratio are known; examples are the double Glan-Taylor prism, the Glan-Thompson prism or thin-film polarizers close to the Brewster angle.

Figure 21:
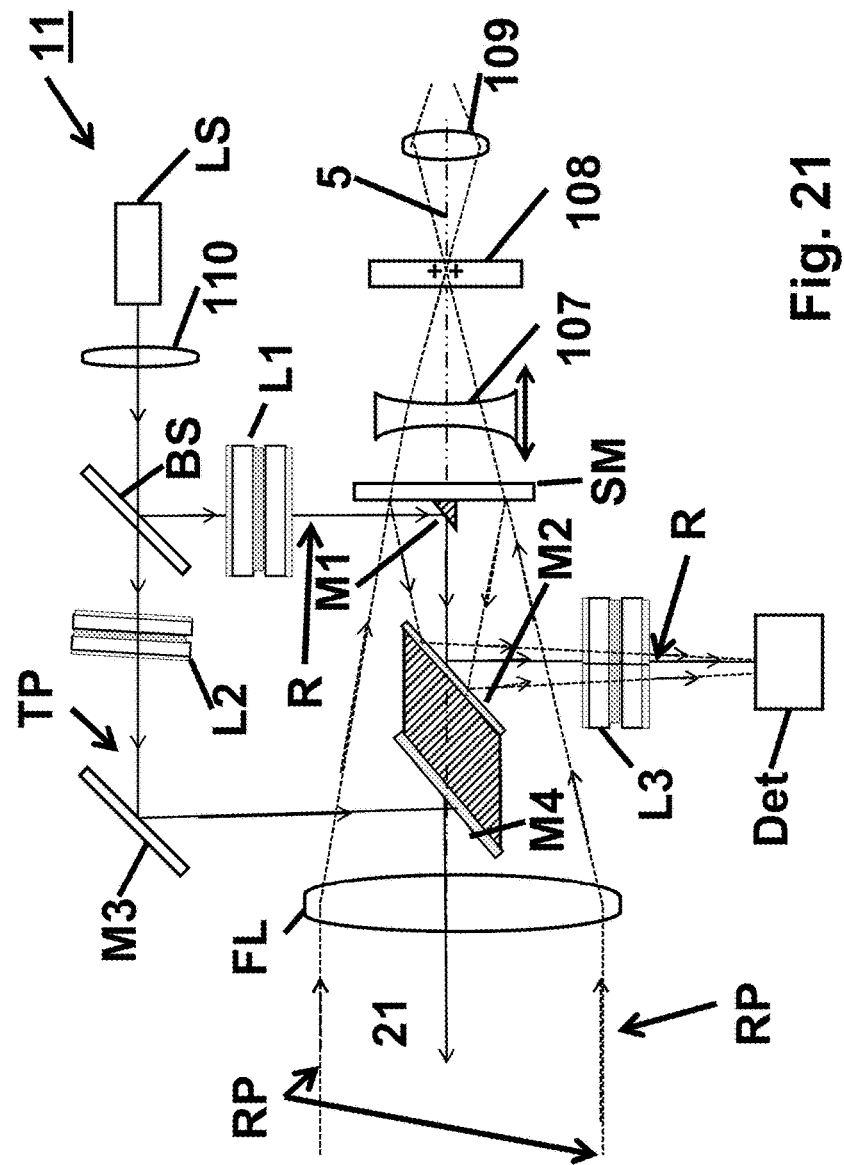
FIG. 21 shows a schematic diagram of the optical construction of a first embodiment of an electronic distance measuring module according to the invention comprising an optical attenuation unit according to the invention.

FIG. 21 shows a schematic diagram of one possible fundamental optical construction according to the invention for a theodolite 11. The emission light from a light source LS, typically designed as a laser or a laser diode, is collimated by a lens 110 and directed onto a beam splitter BS, from where part of the light is deflected as reference light R as far as a 45° deflection mirror M1, which is arranged on the optical axis 5 of an observation telescope of the theodolite. In accordance with the example illustrated, a first optical attenuation unit L1 according to the invention is arranged on the light path situated in between. The reference light light R along the optical axis 5 is then directed further as far as a mirror M2, from where it then passes further, after passing through a further optical attenuation unit L3 according to the invention, onto an optical detector Det.

The other part of the light split by the beam splitter BS passes along the transmission channel TP (transmission light path) to a deflection mirror M3, from where it passes onto a further 45° deflection mirror M4, which is likewise arranged on the optical axis 5 and directs the impinging light as measurement light 21 in the direction of an object to be observed or targeted.

Reception light coming from the object is collected along the reception channel RP with an objective or focusing lens FL and is focused onto a coated substrate plate SM (e.g. coated glass plate) which acts as a spectrally selective mirror and which is provided with a layer that is reflective for IR light or NIR light but is optically transparent otherwise (i.e. at least in the visible spectral range). The light reflected by the substrate plate SM is likewise deflected further via the mirror M2, from where, after passing through the attenuation unit L3, it passes onto the detector Det. The rest of the reception light, without the IR and/or NIR light component reflected out, advances further, without significant alteration by the substrate plate SM, in the observation beam path of the telescope as far as a focusing element 107, which is movable along the optical axis 5. The beam path comprises, arranged downstream further on the optical axis 5, a reticle 108 in the image plane of the focusing element 107 and finally, at the end, an eyepiece 109 for an observer.

As a variant, the transmission channel could be equipped with a TN-LC element and the reception channel could be equipped with a polarization-insensitive scattering mode LC element (smart glasses).

Figure 22:
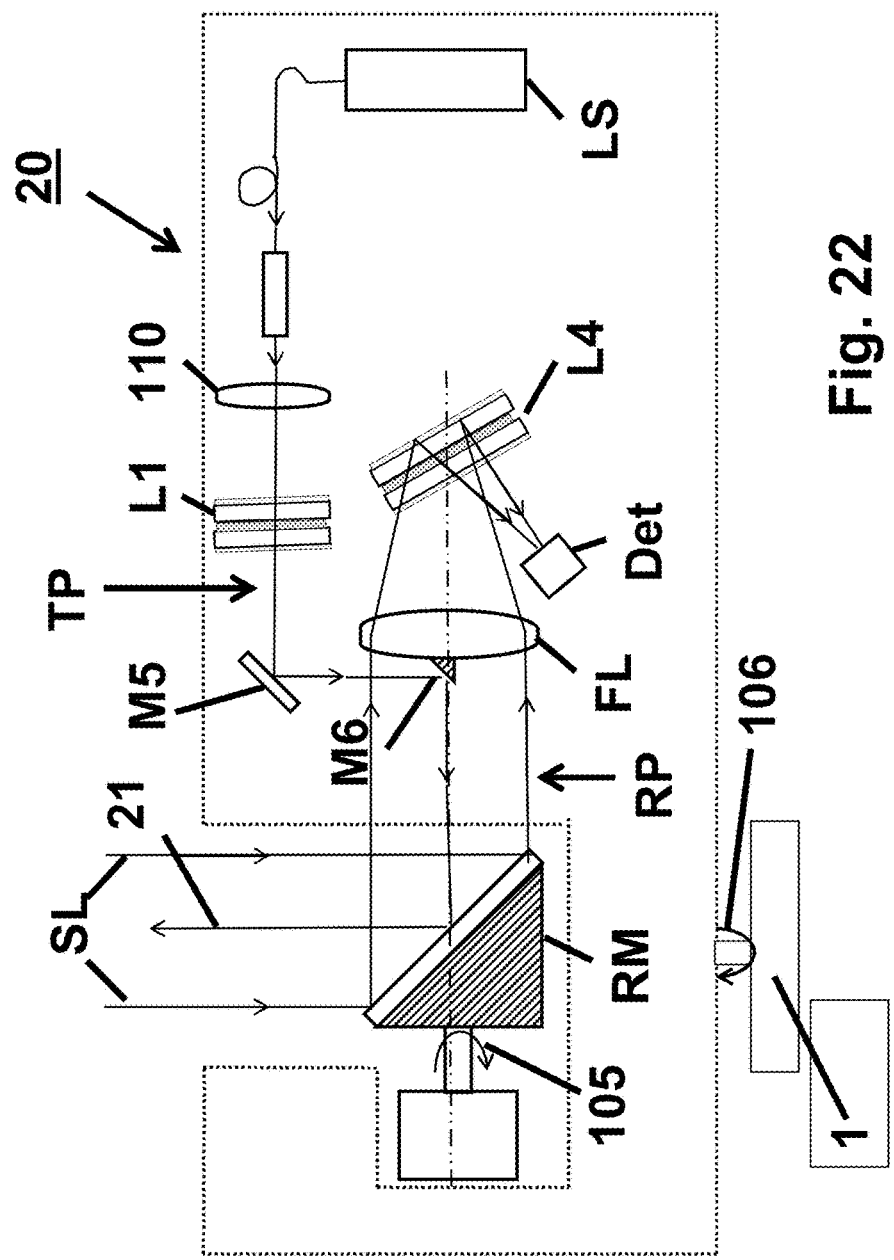
FIG. 22 shows a schematic diagram of the optical construction of a second embodiment of an electronic distance measuring module according to the invention comprising an optical attenuation unit according to the invention.

FIG. 22 shows a modification according to the invention with respect to the embodiment of a possible fundamental optical construction of a scanner as illustrated above in FIG. 2. The emission light from a light source LS, typically a laser, on the transmission light path TP (transmission channel) is firstly collimated by a lens 110 and passed to a first variable optical attenuation unit L1 according to the invention, where the intensity is set as required. The light then passes to a deflection mirror M5, from which it is guided to a further deflection mirror M6. From there, the light passes to a rotating mirror RM, on the surface of which it impinges at an angle of 45° with respect to the perpendicular at the point of incidence, such that it is deflected there at right angles with respect to its direction upstream of the rotating mirror RM as measurement light 21 in the direction of an object to be scanned. The rotating mirror RM is typically rotatable by 360°, as indicated by the arrow 105. Light scattered or reflected at the object and other light proceeding from the object passes jointly as scan light SL in the measurement light path RP back to the rotating mirror RM and are directed from there to a focusing lens FL. In accordance with this illustrated embodiment, the deflection mirror M6 is fitted, for example adhesively bonded, in the center of the focusing lens FL, on the optical axis thereof. However, focusing lens FL and deflection mirror M6 could also be arranged separately from one another. All that is important here is that in the reception light channel RP only the smallest possible proportion of the light is shaded by the deflection mirror M6. The light is concentrated by the focusing lens FL, such that it impinges on a reception surface of a further optical attenuation unit L4 according to the invention, which, in contrast to the embodiments shown above of variable optical attenuation units according to the invention, does not operate in transmission, but rather in reflection, for example by means of a mirror fitted on the rear side. The light reflected and attenuated as necessary by the attenuation unit L4 is then directed onto a detector Det.

The light paths TP and RP illustrated can be realized at least partly by light-transferring optical fibers.

The upper part of the scanner 20, indicated in a manner enclosed by a dotted line, is mounted on a base 1, relative to which said upper part is horizontally rotatable, as indicated by the arrow 106.

The optical elements designated as "mirrors" or "deflection mirrors" in the examples above can, of course, also be realized by different optical reflection or deflection elements, for example by prisms.

What is claimed is:

1. A surveying apparatus embodied as tachymeter, laser scanner, profiler, or laser tracker, comprising an electronic laser distance measuring module, which comprises an optical transmission channel and an optical reception channel for laser measurement radiation, wherein a variable optical attenuation unit for the laser measurement radiation is provided in the optical transmission channel and/or optical reception channel, wherein:

the attenuation unit is constructed and designed in such a way that laser measurement radiation impinging on the attenuation unit is attenuated by means of liquid crystals, and for this purpose at least comprises:

a first polarizer, a liquid crystal shutter having a settable variable transmission, and a second polarizer, hereafter referred to as a first analyzer, wherein the liquid crystals are mixed with spacer elements which are designed as fibers having a length of 3 μm to 15 μm, or which are designed as glass beads having a diameter of 3 μm to 10 μm, or wherein the liquid crystals are not mixed with spacer elements in a light passage region to an optically used opening of the liquid crystal shutter and spacer elements are mixed into the liquid crystals only in an edge region, outside the light passage region to the optically used opening of the liquid crystal shutter.

2. The surveying apparatus according to claim 1, wherein:

the liquid crystal shutter comprises a twisted neumatic liquid crystal cell TN-LCD, and the polarizer and the first analyzer have mutually crossed polarization directions, wherein the liquid crystal cell TN-LCD is operable in the normally white mode, or comprises a vertically aligned neumatic liquid crystal cell VA-LCD, or comprises a fringe field switching liquid crystal cell FFS-LCD.

3. The surveying apparatus according to claim 1, wherein: the liquid crystal shutter comprises a twisted neumatic liquid crystal cell TN-LCD, and the polarizer and the first analyzer have mutually crossed polarization directions, wherein the liquid crystal cell TN-LCD comprises a vertically aligned neumatic liquid crystal cell VA-LCD.

4. The surveying apparatus according to claim 1, wherein: the liquid crystal shutter comprises a twisted neumatic liquid crystal cell TN-LCD, and the polarizer and the first analyzer have mutually crossed polarization directions, wherein the liquid crystal cell TN-LCD comprises a fringe field switching liquid crystal cell FFS-LCD.

5. The surveying apparatus according to claim 1, further comprising:
a second analyzer comprising a polarization sheet and a single-sided self-adhesive film and adhesively bonded onto a transparent carrier and/or provided with an antireflection layer on one side or cemented with the transparent carrier;
wherein the first analyzer and the second analyzer are arranged at the output of the optical beam, and as a result thereof a contrast ratio of 105 is achievable over an angular range of at least 3°.

6. The surveying apparatus according to claim 1, wherein the polarizers
comprise linear polarizers or as circular polarizers, wherein the circular polarizers comprise a combination of a linear polarizer with a λ/4 phase plate, or
comprise wide-angle polarizers and a sandwich structure or combination structure composed of a polarizer and a phase plate, and/or
comprise at least one of plastic-based polarization films, polarizing prisms, double Glan-Taylor prisms, Glan-Thompson prisms, Brewster plates, thin-film polarizers near the Brewster angle, and dielectrically coated splitters.

7. The surveying apparatus according to claim 1, wherein: the polarizers in combination with a liquid crystal shutter have a high contrast of up to greater than 105 between parallel and perpendicular polarization alignment and at the same time a high transmission of up to great than 80% in the case of parallel polarization alignment.

8. The surveying apparatus according to claim 1, wherein: the liquid crystals have a chromatism optimized to a light wavelength of 650 nm, 800 nm or 1550 nm, wherein the liquid crystal shutter has a switching time of shorter than 10 milliseconds.

9. The surveying apparatus according to claim 1, wherein: the liquid crystals have a chromatism optimized to a light wavelength of 650 nm, 800 nm or 1550 nm, wherein the liquid crystal shutter has a switching time of shorter than one millisecond in a temperature range of −20° C. to +60° C.

10. The surveying apparatus according to claim 1, wherein:
the attenuation unit is arranged in the optical transmission channel, and
a polarizer- and/or analyzer-free liquid crystal shutter having a settable, variable transmission is arranged in the optical reception channel.

11. The surveying apparatus according to claim 1, wherein:
the attenuation unit is arranged in the optical transmission channel and
a polarization-selective beam splitter (PB, PB1, PB2) for the polarization-selective splitting of the reception light into two partial beams having different polarizations (s, p) is arranged in the optical reception channel, a respective liquid crystal shutter (L1, L2) being arranged in the optical paths of said partial beams, wherein the partial beams are set to identical optical path lengths and identical light propagation times.

12. The surveying apparatus according to claim 1, wherein:
the attenuation unit is arranged in the optical transmission channel, and
a polarization-selective beam splitter (PB) for the polarization-selective splitting of the reception light into two partial beams having different polarizations (s, p) is arranged in the optical reception channel, wherein both partial beams are passed jointly to a liquid crystal shutter, wherein in one of the two partial beams a λ/2 plate is arranged upstream of the liquid crystal shutter in the optical path, wherein the partial beams are set to identical optical path lengths and identical light propagation times.

* * * * *